United States Patent
Eftekhari et al.

(10) Patent No.: US 11,348,189 B2
(45) Date of Patent: *May 31, 2022

(54) METHODS, SYSTEMS AND COMPUTER PROGRAM PRODUCTS FOR MASKING TAX DATA DURING COLLABORATIVE TAX RETURN PREPARATION

(71) Applicant: Intuit Inc., Mountain View, CA (US)

(72) Inventors: Amir R. Eftekhari, San Diego, CA (US); Paul F. Hubbard, San Diego, CA (US); Andrew Scott Jeddeloh, Beaverton, OR (US); Tyler Thomas Krupicka, Newberg, OR (US)

(73) Assignee: Intuit Inc., Mountain View, CA (US)

( * ) Notice: Subject to any disclaimer, the term of this patent is extended or adjusted under 35 U.S.C. 154(b) by 327 days.

This patent is subject to a terminal disclaimer.

(21) Appl. No.: 16/598,158

(22) Filed: Oct. 10, 2019

(65) Prior Publication Data
US 2020/0043102 A1    Feb. 6, 2020

Related U.S. Application Data

(63) Continuation of application No. 15/009,406, filed on Jan. 28, 2016, now Pat. No. 10,482,544.

(51) Int. Cl.
*G06F 21/60* (2013.01)
*G06Q 40/00* (2012.01)

(52) U.S. Cl.
CPC .................................. *G06Q 40/123* (2013.12)

(58) Field of Classification Search
USPC ........................................... 705/31; 713/189
See application file for complete search history.

(56) References Cited

U.S. PATENT DOCUMENTS

| | | |
|---|---|---|
| 7,200,578 B2 | 4/2007 | Paltenghe |
| 8,108,258 B1 | 1/2012 | Slattery |
| (Continued) | | |

FOREIGN PATENT DOCUMENTS

| | | |
|---|---|---|
| CA | 2811643 | 4/2012 |
| KR | 10-2009-0089225 | 8/2009 |
| WO | WO 2012-044894 | 4/2012 |

OTHER PUBLICATIONS

U.S. Appl. No. 14/528,719, US 2016-0125552, filed Oct. 20, 2014, Pending.

(Continued)

*Primary Examiner* — William E Rankins
(74) *Attorney, Agent, or Firm* — DLA Piper LLP (US)

(57) ABSTRACT

A system for masking tax data during collaborative preparation of an electronic tax return, the system includes a server computer having a tax return preparation program running thereon. The system also includes a tax return preparation computer having a first browser program running thereon. The system further includes a support computer having a second browser program running thereon. Moreover, the system includes a network operatively coupling the server computer, tax return preparation computer, and the support computer. The first browser includes a masking module configured to automatically mask a tax datum without user intervention before transmitting the tax datum to the server computer for subsequent transmission to the support computer. The tax datum is masked in real time during collaborative preparation of the electronic tax return.

17 Claims, 24 Drawing Sheets

(56) References Cited

U.S. PATENT DOCUMENTS

| Patent/Pub No. | Date | Name | Class |
|---|---|---|---|
| 8,191,152 B1 | 5/2012 | Barker | |
| 8,719,086 B1 * | 5/2014 | Gala | G07F 17/3255 463/17 |
| 8,732,845 B1 | 5/2014 | Barker | |
| 8,756,125 B1 | 6/2014 | Goode | |
| 8,898,796 B2 * | 11/2014 | Ben-Natan | H04L 63/20 726/1 |
| 8,965,805 B2 | 2/2015 | Meury et al. | |
| 9,477,942 B2 | 10/2016 | Adachi | |
| 9,786,017 B1 | 10/2017 | Ohme | |
| 10,101,886 B2 | 10/2018 | Adachi | |
| 10,684,750 B2 | 6/2020 | Adachi | |
| 2003/0195780 A1 | 10/2003 | Arora | |
| 2004/0015381 A1 | 1/2004 | Johnson | |
| 2004/0093281 A1 | 5/2004 | Silverstein | |
| 2004/0122905 A1 | 6/2004 | Smith | |
| 2004/0138932 A1 | 7/2004 | Johnson | |
| 2004/0138934 A1 | 7/2004 | Johnson | |
| 2004/0138935 A1 | 7/2004 | Johnson | |
| 2004/0138936 A1 | 7/2004 | Johnson | |
| 2004/0236734 A1 | 11/2004 | Yip | |
| 2004/0243489 A1 | 12/2004 | Mitchell | |
| 2005/0013428 A1 | 1/2005 | Walters | |
| 2005/0131815 A1 | 6/2005 | Fung | |
| 2005/0154617 A1 | 7/2005 | Ruggieri | |
| 2005/0154769 A1 | 7/2005 | Eckart | |
| 2005/0192879 A1 | 9/2005 | Rabbat | |
| 2005/0240881 A1 | 10/2005 | Rush | |
| 2005/0257209 A1 | 11/2005 | Adams | |
| 2005/0289024 A1 | 12/2005 | Hahn-Carlson | |
| 2006/0004746 A1 | 1/2006 | Angus | |
| 2006/0075228 A1 * | 4/2006 | Black | H04L 63/0428 713/167 |
| 2006/0123461 A1 | 6/2006 | Lunt | |
| 2006/0178961 A1 | 8/2006 | Stanley | |
| 2006/0293945 A1 | 12/2006 | Feraud | |
| 2007/0022025 A1 | 1/2007 | Graziano | |
| 2007/0055597 A1 | 3/2007 | Patel | |
| 2007/0061187 A1 | 3/2007 | Laskowski-Bender | |
| 2007/0150139 A1 | 6/2007 | Hardy | |
| 2007/0208503 A1 | 9/2007 | Harnsberger | |
| 2007/0239799 A1 | 10/2007 | Modi | |
| 2007/0250258 A1 | 10/2007 | Hager | |
| 2007/0265995 A1 | 11/2007 | Remington | |
| 2007/0282737 A1 | 12/2007 | Brasch | |
| 2008/0004924 A1 | 1/2008 | Cao | |
| 2008/0147425 A1 | 6/2008 | Durvasula | |
| 2008/0208579 A1 | 8/2008 | Weiss et al. | |
| 2008/0208638 A1 | 8/2008 | Davidson | |
| 2008/0301162 A1 | 12/2008 | Wall | |
| 2009/0043637 A1 | 2/2009 | Eder | |
| 2009/0048884 A1 | 2/2009 | Olives | |
| 2009/0144201 A1 | 6/2009 | Gierkink | |
| 2009/0193046 A1 | 7/2009 | Desai | |
| 2009/0234826 A1 | 9/2009 | Bidlack | |
| 2009/0240737 A1 | 9/2009 | Hardisty | |
| 2009/0282010 A1 | 11/2009 | Vasudevan | |
| 2009/0283591 A1 | 11/2009 | Silbernagl | |
| 2010/0005048 A1 | 1/2010 | Bodapati | |
| 2010/0057742 A1 | 3/2010 | Hardy-McGee | |
| 2010/0076812 A1 | 3/2010 | Ghosh | |
| 2010/0106640 A1 | 4/2010 | Meury | |
| 2010/0299176 A1 | 11/2010 | Mangipudi et al. | |
| 2010/0333012 A1 | 12/2010 | Adachi | |
| 2011/0087575 A1 | 4/2011 | DeBie | |
| 2011/0191191 A1 | 8/2011 | Bax | |
| 2011/0231246 A1 | 9/2011 | Bhatia | |
| 2011/0289109 A1 | 11/2011 | Yoshida | |
| 2012/0016738 A1 | 1/2012 | Ouimet | |
| 2012/0022983 A1 | 1/2012 | Hughes | |
| 2012/0084185 A1 | 4/2012 | Ciaramitaro et al. | |
| 2012/0102036 A1 | 4/2012 | Parker, III | |
| 2012/0109734 A1 | 5/2012 | Fordyce, III | |
| 2012/0173250 A1 | 7/2012 | Jeffrey | |
| 2012/0173397 A1 | 7/2012 | Elwell | |
| 2012/0189186 A1 | 7/2012 | Csulits | |
| 2012/0226583 A1 | 9/2012 | Uehara | |
| 2012/0278738 A1 * | 11/2012 | Kruse | G06Q 10/10 715/754 |
| 2012/0284105 A1 | 11/2012 | Li | |
| 2013/0282725 A1 * | 10/2013 | Rubinger | G06Q 10/20 707/740 |
| 2013/0312107 A1 * | 11/2013 | Agrawal | G06F 21/62 726/26 |
| 2014/0013452 A1 * | 1/2014 | Aissi | G06F 21/604 726/30 |
| 2014/0114822 A1 | 4/2014 | Sharma et al. | |
| 2014/0114823 A1 | 4/2014 | Pai | |
| 2014/0214636 A1 | 7/2014 | Rajsky | |
| 2014/0280377 A1 | 9/2014 | Frew | |
| 2014/0282464 A1 | 9/2014 | El-Gillani | |
| 2014/0358747 A1 | 12/2014 | Meury et al. | |
| 2015/0067886 A1 * | 3/2015 | Maman | G06F 21/6227 726/27 |
| 2016/0012428 A1 | 1/2016 | Haldenby | |
| 2016/0125552 A1 | 5/2016 | Pathak | |
| 2017/0004314 A1 * | 1/2017 | Blumenau | G06F 21/62 |
| 2017/0097996 A1 * | 4/2017 | Gullett | G06Q 10/063 |

OTHER PUBLICATIONS

U.S. Appl. No. 13/475,626, filed May 18, 2012, Issued.
U.S. Appl. No. 12/358,545, filed Jan. 23, 2009, Issued.
U.S. Appl. No. 14/528,719, filed Oct. 30, 2014.
Budgeting and Planning made easy; How technology changes the game, Jul. 30, 2013 (BudgetingandPlanningmadeEasy) https://crgroup.conn/wp-content/uploads/PDF/BudgetingandPlanningnnadeeasy.pdf (Year: 2013).
Written Opinion issued in PCT/US2017/014434 dated May 1, 2017.
Search Report issued in PCT/US2017/014434 dated May 1, 2017.
Canadian Office Action issued in CA 2,874,605 dated Jun. 20, 2016.
Canadian Office Action issued in CA 2,874,605 dated Sep. 12, 2017.
U.S. Appl. No. 12/358,545, filed Jan. 23, 2009.
U.S. Appl. No. 13/475,626, filed May 18, 2012.

* cited by examiner

Are Paul and Christine still filing a joint return for 2015?

● Yes, we're still filing a joint return for 2015.
○ No, we're not filing a joint return for 2015.

312

Are Paul and Christine still filing a joint return for 2015?

● Yes, we're still filing a joint return for 2015.
○ No, we're not filing a joint return for 2015.

310

Your personal info ⟵ 300a

1. Let's get the rest of your personal info

First name: James  
Middle Initial:  
Last name: Smith  
Jr., Sr., etc:

Date of birth: 02/02/1980 ⟵ 320

Social Security number Learn more ⟵ 318  
123-45-6789

Your personal info ⟵ 300b

1. Let's get the rest of your personal info

First name: James  
Middle Initial:  
Last name: Smith  
Jr., Sr., etc:

Date of birth: 02/02/1980 ⟵ 320

Social Security number Learn more ⟵ 322  
XXXXXXXXX

FIG. 20B

METHODS, SYSTEMS AND COMPUTER PROGRAM PRODUCTS FOR MASKING TAX DATA DURING COLLABORATIVE TAX RETURN PREPARATION

This application is a continuation of U.S. application Ser. No. 15/009,406, filed Jan. 28, 2016, entitled "METHODS, SYSTEMS AND COMPUTER PROGRAM PRODUCTS FOR MASKING TAX DATA DURING COLLABORATIVE TAX RETURN PREPARATION. The content of which is incorporated herein by reference in its entirety.

This application includes subject matter similar to the subject matter described in the following co-owned applications: U.S. application Ser. No. 12/358,545, filed Jan. 23, 2009, now U.S. Pat. No. 9,191,152, issued May 29, 2012, entitled "METHODS SYSTEMS AND ARTICLES OF MANUFACTURE FOR GENERATING AND DISPLAYING VIDEO RELATED TO FINANCIAL APPLICATION"; and U.S. application Ser. No. 14/528,719, filed Oct. 30, 2014, entitled "METHODS, SYSTEMS AND COMPUTER PROGRAM PRODUCTS FOR COLLABORATIVE TAX RETURN PREPARATION." The contents of which are incorporated herein by reference in their entirety.

SUMMARY

Embodiments are directed to computer-implemented methods for calculating an estimated result while preparing an electronic tax return.

In one embodiment directed to a system for masking tax data during collaborative preparation of an electronic tax return, the system includes a server computer having a tax return preparation program running thereon. The system also includes a tax return preparation computer having a first browser program running thereon. The system further includes a support computer having a second browser program running thereon. Moreover, the system includes a network operatively coupling the server computer, tax return preparation computer, and the support computer. The first browser includes a masking module configured to automatically mask a tax datum without user intervention before transmitting the tax datum to the server computer for subsequent transmission to the support computer. The tax datum is masked in real time during collaborative preparation of the electronic tax return.

In a single or multiple embodiments, the masking module includes a JavaScript program. The masking module may be configured to automatically mask the tax datum without user intervention before the first browser transmits the tax datum to the server for subsequent transmission to the support computer. The masking module may be configured to determine a security level for the support computer and to mask the tax datum based on the security level.

In a single or multiple embodiments, the first browser includes a pattern recognition module configured to identify sensitive taxpayer data. The server computer may have a metadata markup module running thereon, the metadata markup module being configured to identify sensitive taxpayer data fields.

In a single or multiple embodiments, the server computer has a co-browsing module running thereon, the co-browsing module being configured to send data related to a tax return to the tax return preparation computer and the support computer for display using the first and second browser programs, respectively. The co-browsing module may be configured to send an invitation to join a co-browsing session to the support computer, the invitation including a hyperlink. The co-browsing module may be configured to generate an access code for the co-browsing session and send the access code to the tax return preparation computer. The co-browsing module may be configured to send data related to the tax return to the support computer only after the support computer enters the access code at a page accessed through the hyperlink.

In another embodiment directed to a computer-implemented method for masking tax data during collaborative preparation of an electronic tax return using a system including a server computer, a tax return preparation computer, and a support computer operatively coupled by a network, the method includes a first browser running on the tax return preparation computer automatically masking a tax datum without user intervention before transmitting the tax datum to the server computer for subsequent transmission to the support computer. The tax datum is masked in real time during collaborative preparation of the electronic tax return.

In a single or multiple embodiments, the first browser includes a masking module. The method also includes the masking module automatically masking the tax datum without user intervention before the first browser transmits the tax datum to the server for subsequent transmission to the support computer. The method may further include the masking module determining a security level for the support computer and masking the tax datum based on the security level.

In a single or multiple embodiments, the first browser includes a pattern recognition module. The method also includes the pattern recognition module identifying sensitive taxpayer data.

In a single or multiple embodiments, the server computer has a metadata markup module running thereon. The method also includes the metadata markup module identifying sensitive taxpayer data fields.

In a single or multiple embodiments, the server computer has a co-browsing module running thereon. The method also includes the co-browsing module sending data related to a tax return to the tax return preparation computer and the support computer for display using the first and second browser programs, respectively.

In a single or multiple embodiments, the method also includes the co-browsing module sending an invitation to join a co-browsing session to the support computer, the invitation including a hyperlink. The method may further include the co-browsing module generating an access code for the co-browsing session and sending the access code to the tax return preparation computer. Moreover, the method may include the co-browsing module sending data related to the tax return to the support computer only after the support computer enters the access code at a page accessed through the hyperlink.

Still another embodiment is directed to a computer program product including a non-transitory computer readable storage medium embodying one or more instructions executable by a computer system having a server computing device and a tax return preparation computing device to perform a process for masking tax data during collaborative preparation of an electronic tax return using a system including a server computer, a tax return preparation computer, and a support computer operatively coupled by a network. The process includes a first browser running on the tax return preparation computer automatically masking a tax datum without user intervention before transmitting the tax datum to the server computer for subsequent transmission to the support computer. The tax datum is masked in real time during collaborative preparation of the electronic tax return.

BRIEF DESCRIPTION OF THE DRAWINGS

The foregoing and other aspects of embodiments are described in further detail with reference to the accompanying drawings, in which the same elements in different figures are referred to by common reference numerals, wherein:

FIGS. 12 to 20B generally illustrate various user interfaces for collaborative tax return preparation including masking of taxpayer data.

Figure 1:
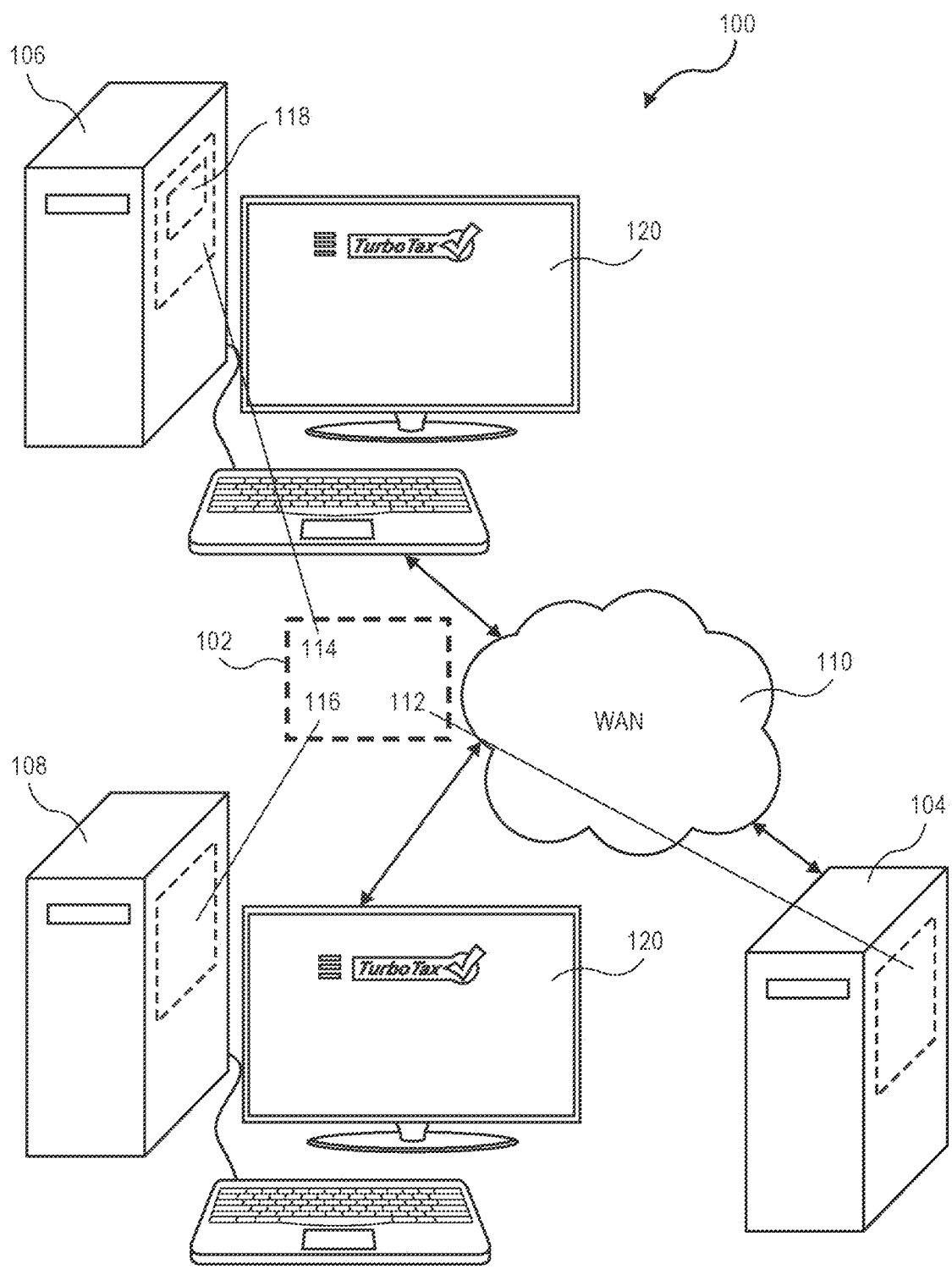
FIGS. 1 to 4 are schematic diagrams illustrating the implementation of taxpayer data masking systems on computing devices according to various embodiments.

In order to better appreciate how to obtain the above-recited and other advantages and objects of various embodiments, a more detailed description of embodiments is provided with reference to the accompanying drawings. It should be noted that the drawings are not drawn to scale and that elements of similar structures or functions are represented by like reference numerals throughout. It will be understood that these drawings depict only certain illustrated embodiments and are not therefore to be considered limiting of scope of embodiments.

DETAILED DESCRIPTION OF ILLUSTRATED EMBODIMENTS

Embodiments describe methods, systems and articles of manufacture for masking tax data during collaborative preparation of an electronic tax return. In particular, the embodiments describe recognizing and masking sensitive taxpayer data before transmitting the sensitive taxpayer data to a support computer.

Some current electronic tax return preparation systems are configured for collaborative electronic tax return preparation. Current systems facilitate a support user (e.g., a family member, a friend, an accountant, a customer service associate—"CSA", etc.) assisting a preparer user (e.g., taxpayer, tax preparer, etc.) in real time during the preparation of an electronic tax return using a tax return preparation program. Examples of tax return preparation programs that may be programmed to incorporate or utilize collaborative electronic tax return preparation according to embodiments include desktop or online versions of TURBOTAX, PROSERIES, and LACERTE tax return preparation applications, available from Intuit Inc. TURBOTAX, PROSERIES AND LACERTE are registered trademarks of Intuit Inc., Mountain View Calif. Collaborative tax return preparation systems are described in U.S. application Ser. No. 14/528,719, filed Oct. 30, 2014, the contents of which have been previously incorporated-by-reference herein.

However, the taxpayer's sensitive information may be exposed to the support user during collaborative tax return preparation. Depending on the nature of the relationship between the support and taxpayer, it may be desirable to control the exposure of sensitive information to the support user. For instance, while a taxpayer may not be concerned about exposing their social security number to their parent, the taxpayer may not want to expose their social security number to a CSA for the tax return preparation program.

The embodiments described herein address the problem of sensitive taxpayer information exposure during collaborative tax return preparation by using various systems and components to mask the sensitive taxpayer information before the taxpayer information is sent to the support computer of the support user. This improves the security of and increases taxpayer confidence in collaborative tax return preparation. Improving the customer experience increases the probability that a taxpayer will use and benefit from support provided through collaborative tax return preparation.

The embodiments described herein address the computer-centric/Internet-centric problem of sensitive taxpayer information exposure during collaborative tax return preparation. The embodiments transform the taxpayer information transmitted to the support computer to address this problem. The embodiments also modify the user interface on the support computer to address this problem.

As used in this application, a "preparer," "user" or "taxpayer" includes, but is not limited to, a person preparing a tax return using tax return preparation software. The "preparer," "user" or "taxpayer" may or may not be obligated to file the tax return. As used in this application, "tax data" includes, but is not limited to, information that may affect a user's income tax burden, including information typically included in a tax return. As used in this application, "taxpayer data" includes, but is not limited to, information relating to a taxpayer, including, but not limited to, tax data. The terms "tax data" and "taxpayer data," as used in this application, also include, but are not limited to, partially or fully completed tax forms (electronic and hard copy) that include information typically included in a tax return.

As used in this application, "financial management system" includes, but is not limited to, software that oversees and governs an entity's income, expenses, and assets. An exemplary financial management system is MINT Financial Management Software, which is available from Intuit Inc. of Mountain View, Calif. A financial management system is executed to assist a user with managing its finances, and is used solely for financial management. Financial management systems manage financial transaction data from financial transaction generators such as accounts including checking, savings, money market, credit card, stock, loan, mortgage, payroll or other types of account. Such financial transaction generators can be hosted at a financial institution such as a bank, a credit union, a loan services or a brokerage. Financial transaction data may include, for example, account balances, transactions (e.g., deposits, withdraws, and bill payments), debits, credit card transactions (e.g., for merchant purchases). Financial management systems can also obtain financial transaction data directly from a merchant computer or a point of sale terminal. Financial management systems can include financial transaction data aggregators that manage and organize financial transaction data from disparate sources. While certain embodiments are described with reference to MINT Financial Management Software, the embodiments described herein can include other financial management systems such as QUICKEN Financial Management Software, QUICKRECIPTS Financial Management Software, FINANCEWORKS Financial Management Software, Microsoft Money Financial Management Software and YODLEE Financial Management Software (available from Yodlee, Inc. of Redwood City, Calif.).

As used in this application, "computer," "computer device," or "computing device" includes, but are not limited to, a computer (laptop or desktop) and a computer or computing device of a mobile communication device, smartphone and tablet computing device such as an IPAD (available from Apple Inc. of Cupertino, Calif.). As used in this application, "tax preparation system," "tax preparation computing device," "tax preparation computer," "tax preparation software," "tax preparation module," "tax preparation application," "tax preparation program," "tax return preparation system," "tax return preparation computing device," "tax return preparation computer," "tax return preparation software," "tax return preparation module," "tax return preparation application," or "tax return preparation program" includes, but are not limited to, one or more separate and independent software and/or hardware components of a computer that must be added to a general purpose computer before the computer can prepare tax returns, and computers having such components added thereto.

As used in this application, "server" or "server computer" includes, but is not limited to, one or more separate and independent software and/or hardware components of a computer that must be added to a general purpose computer before the computer can receive and respond to requests from other computers and software in order to share data or hardware and software resources among the other computers and software, and computers having such components added thereto. As used in this application, "browser," "web browser," "browser program" or "web browser program" includes, but is not limited to, one or more separate and independent software and/or hardware components of a computer that must be added to a general purpose computer before the computer can receive, display and transmit resources from/to the World Wide Web. As used in this application, "website" includes, but is not limited to, one or more operatively coupled webpages.

As used in this application, "input/output module" includes, but is not limited to, one or more separate and independent software and/or hardware components of a computer that must be added to a general purpose computer before the computer can communicate with and facilitate the receipt and transfer of information, including tax data and taxpayer data, from and to other computers. As used in this application, "memory module" includes, but is not limited to, one or more separate and independent software and/or hardware components of a computer that must be added to a general purpose computer before the computer can store information, including tax data and taxpayer data.

As used in this application, "masking module" includes, but is not limited to, one or more separate and independent components of a computer that must be added to a general purpose computer before the computer can obfuscate data that forms portions of a user interface intended to be displayed to a user. As used in this application, "pattern recognition module" includes, but is not limited to, one or more separate and independent software and/or hardware components of a computer that must be added to a general purpose computer before the computer can analyze data to identify the category to which the data belongs. As used in this application, "co-browsing module" includes, but is not limited to, one or more separate and independent software and/or hardware components of a computer that must be added to a general purpose computer before the computer can facilitate a shared web-browsing experience for a plurality of users. As used in this application, "metadata markup module" includes, but is not limited to, one or more separate and independent software and/or hardware components of a computer that must be added to a general purpose computer before the computer can analyze a taxpayer data entry user interface to identify and tag a sensitive taxpayer data field.

As used in this application, an action occurring "in real time" during a process includes, but is not limited to, the action occurring the process with minimal delay (if any) in the process, such that a typical user would not notice any delay in the process.

FIG. 1 depicts an exemplary hardware system 100 on which a tax data masking system 102 according to one embodiment can be executed. The hardware system 100 according to this embodiment includes a server computing device 104, a tax return preparation computing device 106 and a support computing device 108, which are operatively coupled via a network 110. The network 110 may be two or more networks depending on the system configuration and communication protocols employed. One or more or all of networks 110 may be, for example, a wireless or cellular network, a Local Area Network (LAN) and/or a Wide Area Network (WAN). Reference to network 110 generally is not intended to refer to a specific network or communications protocol, and embodiments can be implemented using various networks 110 and combinations thereof.

The tax data masking system 102 includes a tax return preparation program 112 running on the server computing device 104 and first and second browser programs 114, 116 running on the tax return preparation computing device 106 and the support computing device 108, respectively. The first and second browser programs 114, 116 are configured to access various programs running on the server computing device 104. For instance, the first browser program 114 is configured to access the tax return preparation program 112 running on the server computing device 104. The second browser program 114 is configured to access a co-browsing program, which is described below. The tax data masking system 102 also includes a masking module 118 (in the first browser program 114) configured to obfuscate data that forms portions of a user interface intended to be displayed to a user. Data can be obfuscated by masking the portions of the user interface including the data before display to the user.

The various computing devices 104, 106, 108 may include visual displays or screens 120 operatively coupled thereto. In the embodiment depicted in FIG. 1, the tax return preparation computing device 106 includes a display or a screen 120 through which a preparer user physically interfaces with the tax return preparation computing device 106 and the first browser program 114 running thereon. Also, the support computing device 108 includes a display or a screen 120 through which a support user physically interfaces with the support computing device 108 and the second browser program 116 running thereon.

While the tax return preparation computing device 106 and the support computing device 108 in FIG. 1 are depicted as desktop computers running first and second browsers 114, 116 thereon, In other embodiments, one or both of the return preparation computing device 106 and the support computing device 108 may be mobile computing devices (e.g., smartphones or tablets). In such embodiments, communication may occur over a private communication network (e.g., mobile phone network). Also, the programs running on the server computing device 104 may be accessed by applications running on the tax return preparation computing device 106 and the support computing device 108.

In other embodiments, a tax return preparation computing program may run on the tax return preparation computing device 106.

Examples of tax return preparation programs 112 that may be programmed to utilize the masking module 118 according to embodiments include desktop or online versions of TURBOTAX, PROSERIES, and LACERTE tax return preparation applications, available from Intuit Inc. TURBOTAX, PROSERIES AND LACERTE are registered trademarks of Intuit Inc., Mountain View Calif.

Figure 2:
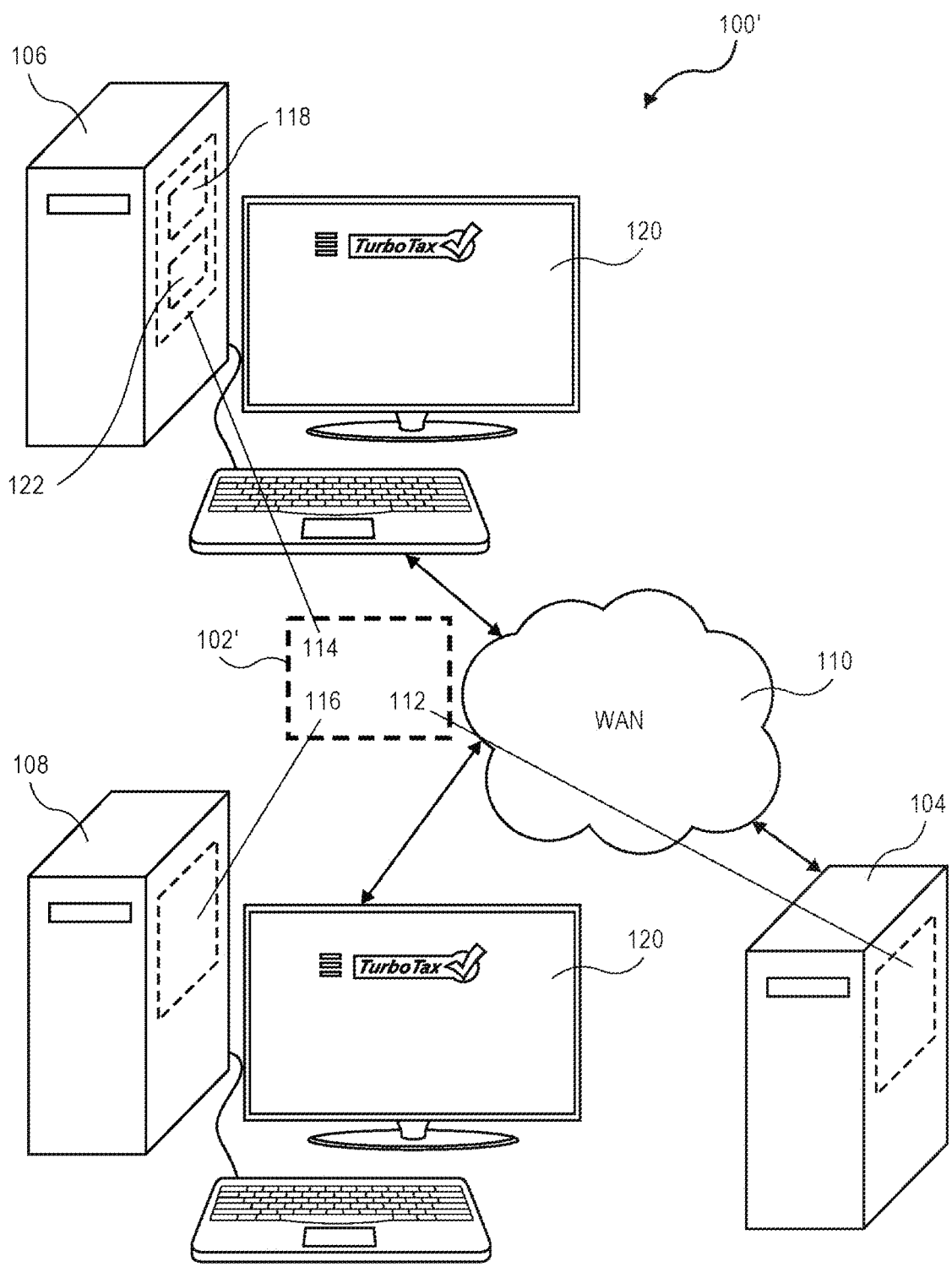

FIG. 2 depicts another exemplary hardware system 100' on which a tax data masking system 102' according to another embodiment can be executed. The systems 100', 102' depicted in FIG. 2 are similar to the systems 100, 200 depicted in FIG. 1. However, in addition to the masking module 118, the first browser program 114 in the collaborative tax preparation system 102' depicted in FIG. 2 also includes a pattern recognition module 122. The pattern recognition module 122 is configured to analyze data to identify the category to which the data belongs. For instance, the pattern recognition module 122 can be configured to identify numerical data entered into the first browser program 114 in the format XXX-XX-XXXX as a social security number with a predetermined sensitivity level corresponding thereto.

Figure 3:
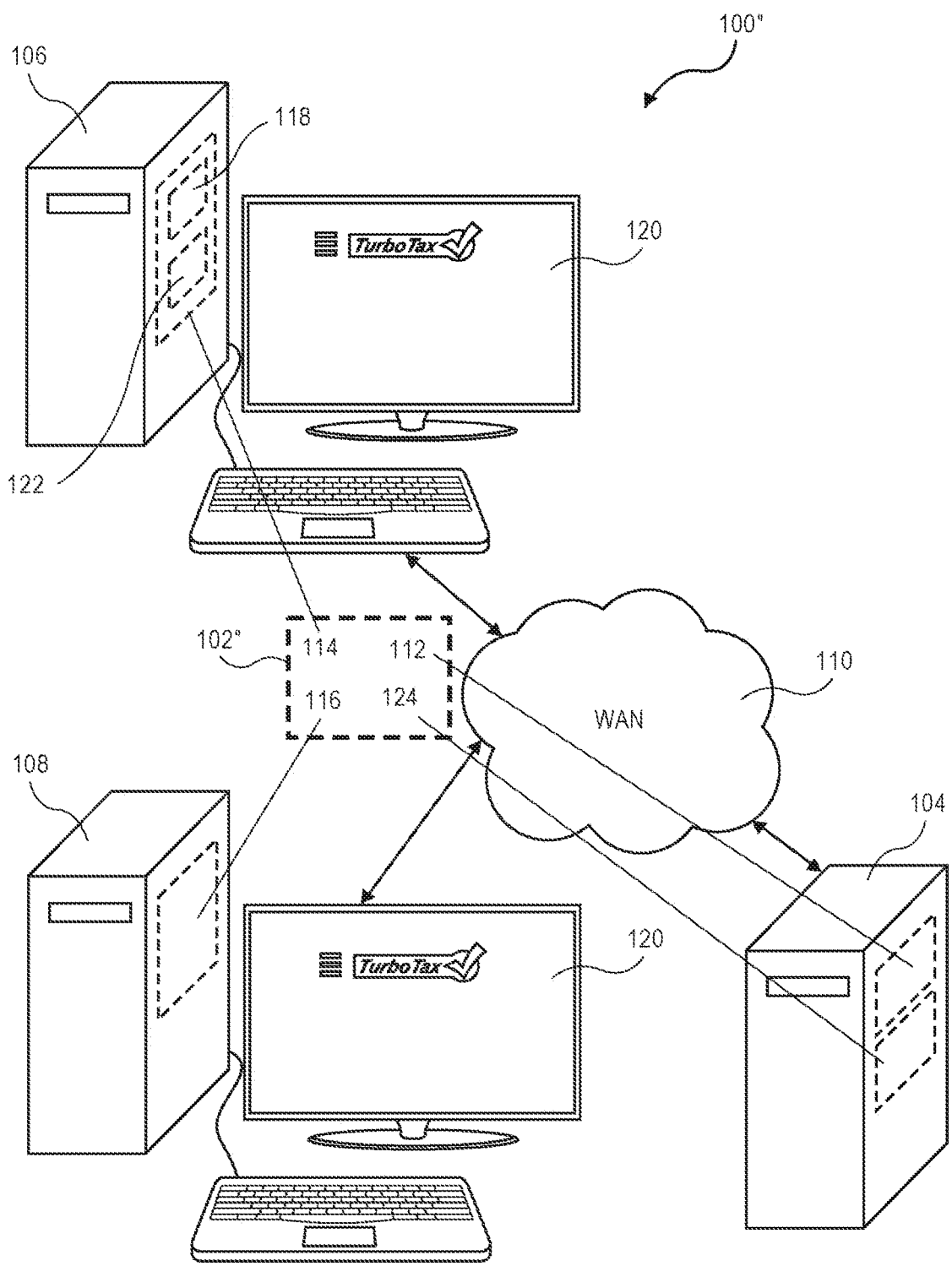

FIG. 3 depicts still another exemplary hardware system 100" on which a tax data masking system 102" according to still another embodiment can be executed. The systems 100", 102" depicted in FIG. 3 are similar to the systems 100', 200' depicted in FIG. 2. However, in addition to the tax return preparation program 112, the server computing device 104 depicted in FIG. 3, also includes a co-browsing module 124 running thereon. The co-browsing module 124 is configured to facilitate a shared web-browsing experience for a plurality of users by passing data between the tax return preparation computing device 106 and the support computing device 108. For instance, co-browsing module 124 can be configured to facilitate a support user's access to a preparer user's online tax return preparation experience by displaying portions of the preparer user's online tax return preparation user interface to the support user.

Figure 4:
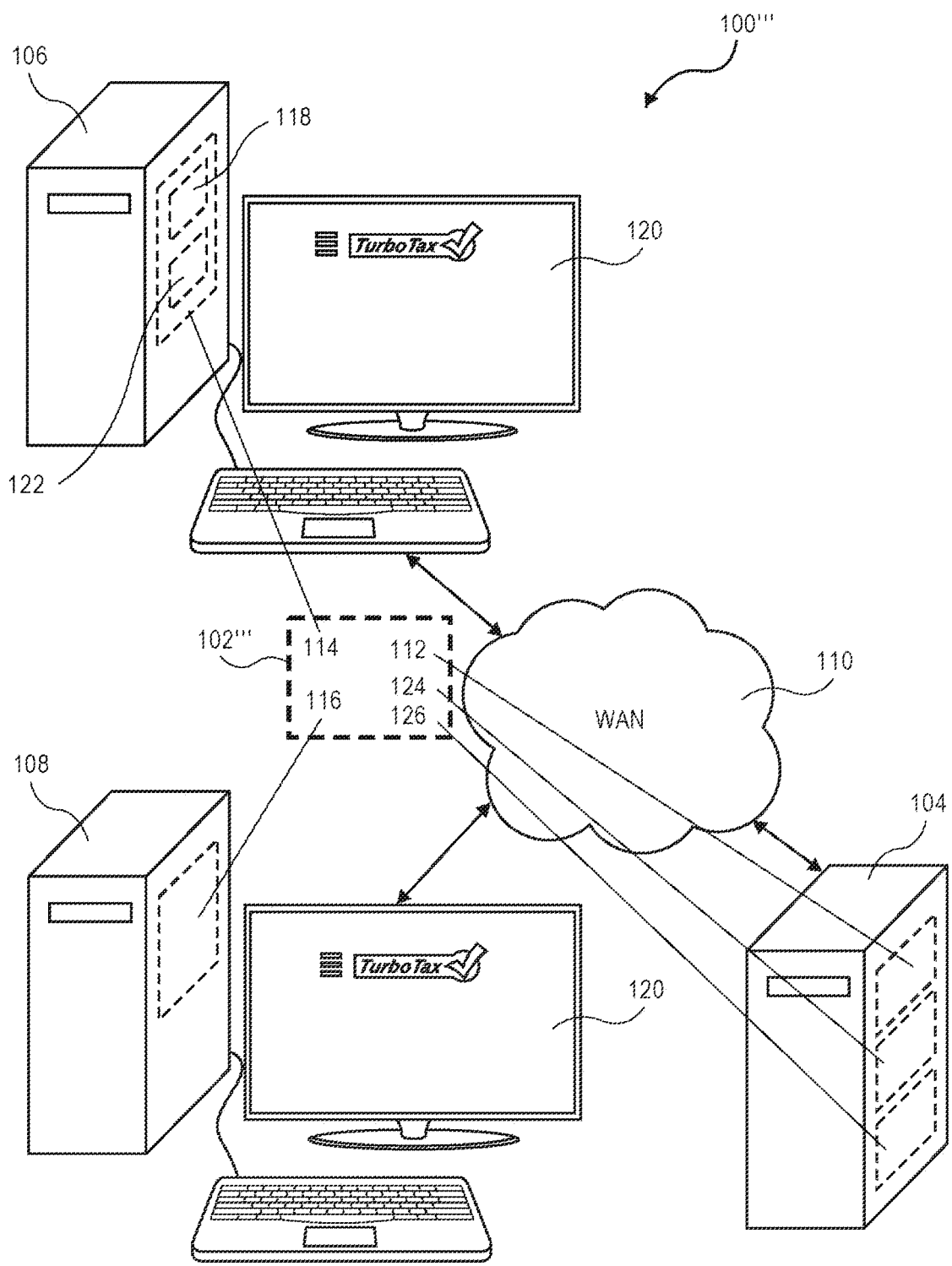

FIG. 4 depicts still another exemplary hardware system 100''' on which a tax data masking system 102''' according to still another embodiment can be executed. The systems 100''', 102''' depicted in FIG. 4 are similar to the systems 100", 200" depicted in FIG. 3. However, in addition to the tax return preparation program 112 and the co-browsing module 124, the server computing device 104 depicted in FIG. 4, also includes a metadata markup module 126 running thereon. The metadata markup module 126 is configured to analyze a taxpayer data entry user interface to identify and tag a sensitive taxpayer data field. For instance, metadata markup module 126 can be configured to analyze the current tax year's federal income tax data entry user interface and to tag the social security number field in the user interface as asking for sensitive information with a predetermined sensitivity level corresponding thereto.

Figure 5:
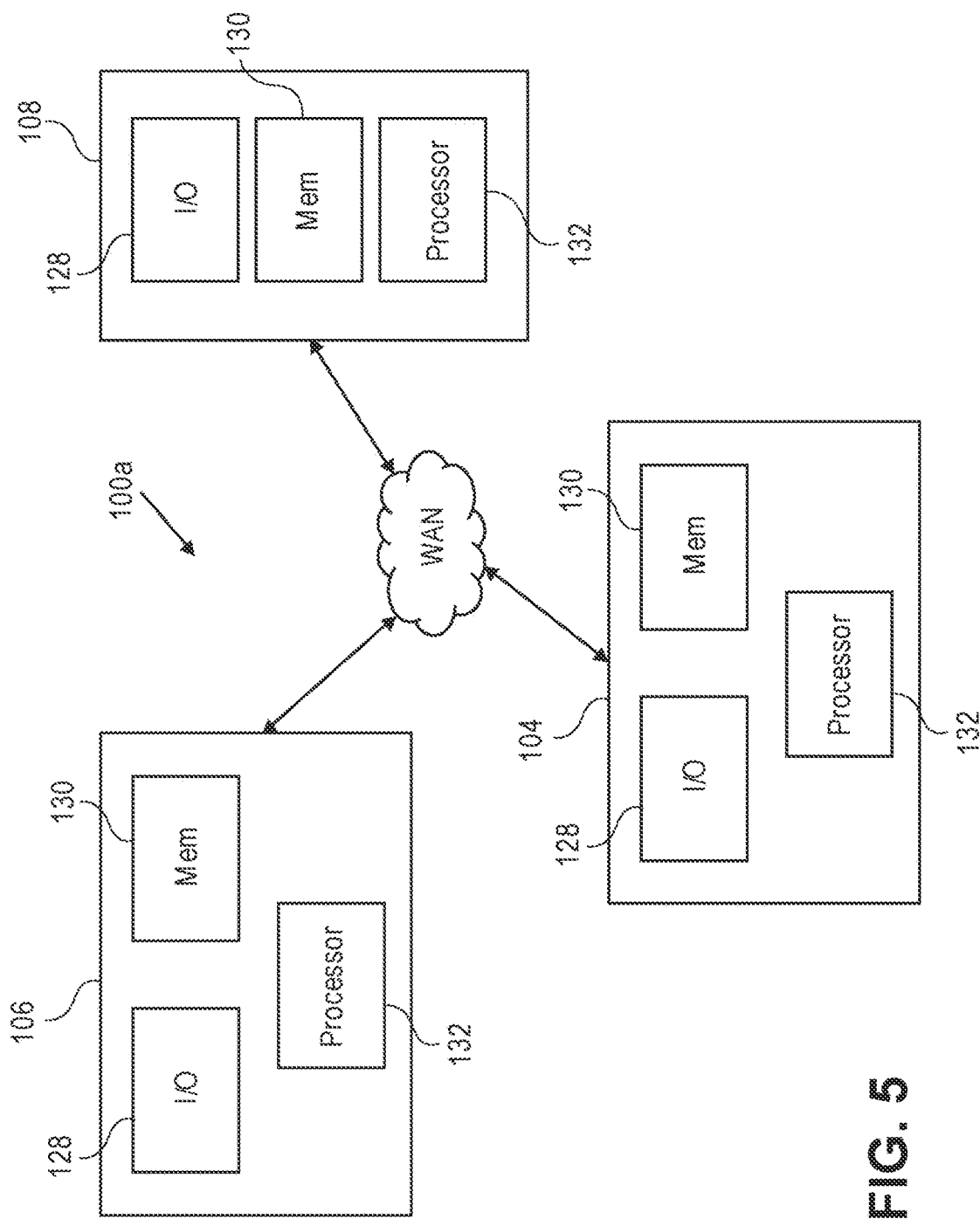
FIGS. 5 to 10 are block diagrams of computer systems according to various embodiments on which taxpayer data masking systems according to various embodiments may be implemented.

FIG. 5 depicts, in greater detail, another hardware system 100a configured to host a tax data masking system according to one embodiment. Like the hardware system 100 depicted in FIG. 1, the hardware system 100a in FIG. 5 includes a server computing device 104, a tax return preparation computing device 106 and a support computing device 108 that are operatively coupled by a network 110. The server computing device 104 includes an input/output module 120, a memory module 122 and a processor 124. The tax return preparation computing device 106 includes an input/output module 120, a memory module 122 and a processor 124. The support computing device 108 includes an input/output module 120, a memory module 122 and a processor 124. The input/output modules 120 are configured to communicate with and facilitate the receipt and transfer of information, including tax data and taxpayer data, as well as information relating to the sensitivity of tax data and taxpayer data. The memory modules 122 are configured to information, including tax data and taxpayer data, as well as information relating to the sensitivity of tax data and taxpayer data, in proper formats for masking tax data during collaborative tax return preparation. The processors 124 are configured to run programs (e.g., tax return preparation program 112 and first and second browser programs 114, 116), as shown in FIG. 6.

Figure 6:
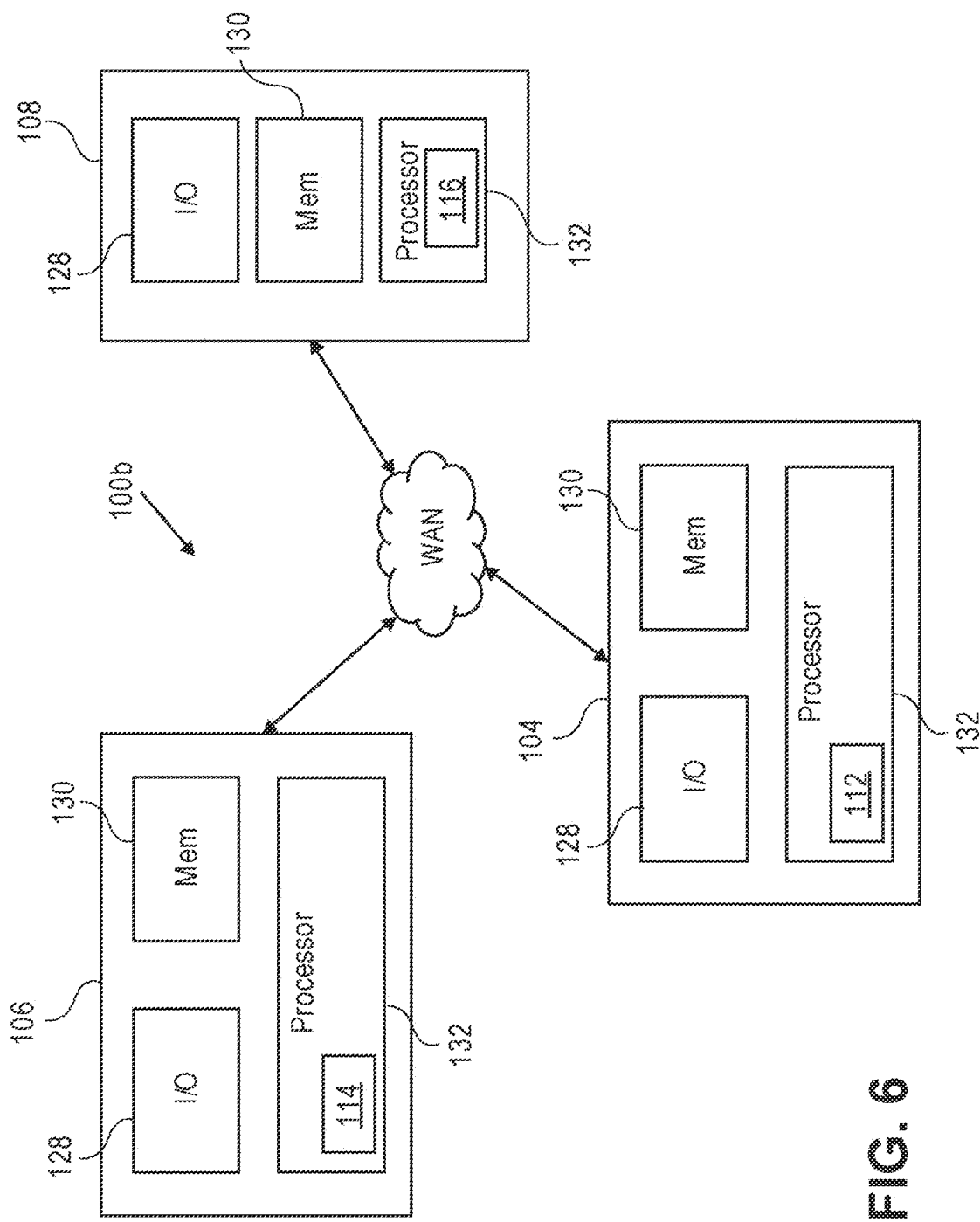

FIG. 6 depicts, in even greater detail, another hardware system 100b configured to host a tax data masking system 102 according to one embodiment. Like the hardware systems 100a depicted in FIG. 5, the hardware system 100b in FIG. 6 includes a server computing device 104, a tax return preparation computing device 106 and a support computing device 108 that are operatively coupled by a network 110. The processor 132 in the server computing device 104 has a tax return preparation program 112 running thereon. The processor 132 in the tax return preparation computing device 106 has a first browser program 114 running thereon. The processor 132 in the support computing device 108 has a second browser program 116 running thereon.

Figure 7:
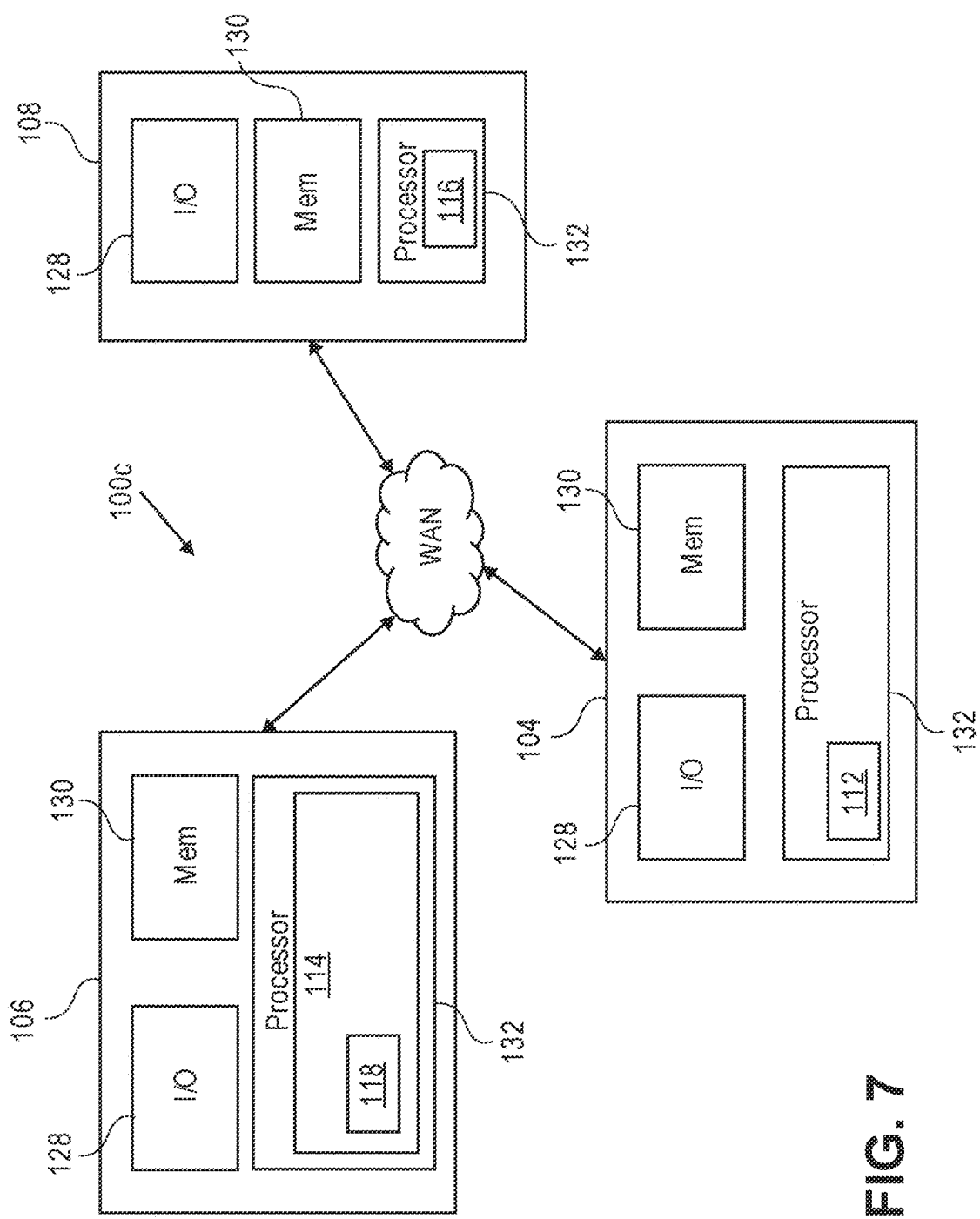

FIG. 7 depicts, in even greater detail, another hardware system 100c configured to host a tax data masking system 102 according to one embodiment. Like the hardware systems 100b depicted in FIG. 6, the hardware system 100c in FIG. 7 includes a server computing device 104, a tax return preparation computing device 106 and a support computing device 108 that are operatively coupled by a network 110. The first browser program 114 depicted in FIG. 7 includes a masking module 118 (described above).

Figure 8:
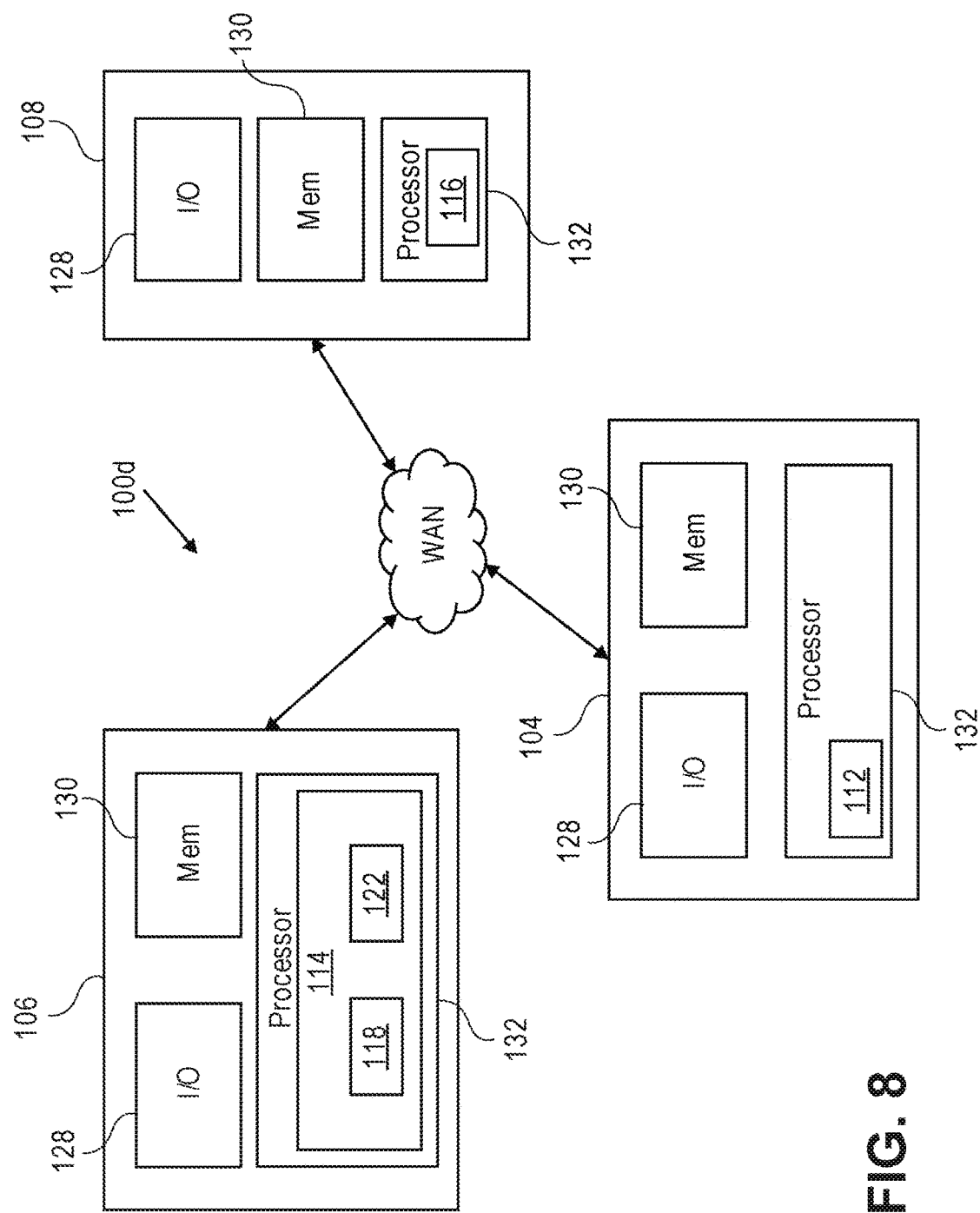

FIG. 8 depicts, in even greater detail, another hardware system 100d configured to host a tax data masking system 102 according to one embodiment. Like the hardware systems 100c depicted in FIG. 7, the hardware system 100d in FIG. 8 includes a server computing device 104, a tax return preparation computing device 106 and a support computing device 108 that are operatively coupled by a network 110. In addition to the masking module 118, the first browser program 114 depicted in FIG. 8 also includes a pattern recognition module 122 (described above).

Figure 9:
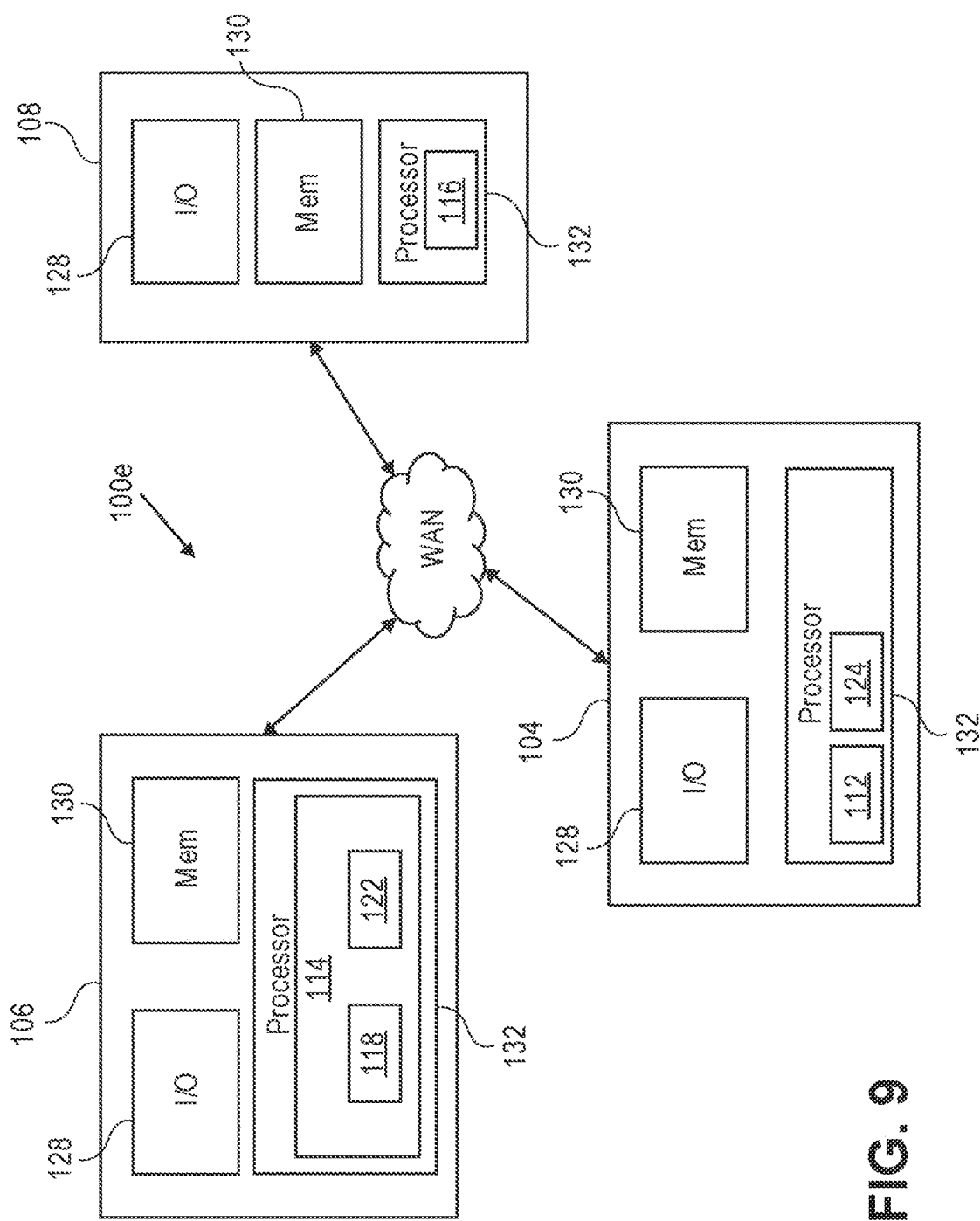

FIG. 9 depicts, in even greater detail, another hardware system 100e configured to host a tax data masking system 102 according to one embodiment. Like the hardware systems 100d depicted in FIG. 8, the hardware system 100e in FIG. 9 includes a server computing device 104, a tax return preparation computing device 106 and a support computing device 108 that are operatively coupled by a network 110. In addition to the tax return preparation program 112, the processor 132 in the server computing device 104 depicted in FIG. 9 also includes a co-browsing module 124 (described above). In the embodiment depicted in FIG. 9, the tax return preparation program 112 and the co-browsing module 124 are related but separate components such that the tax return preparation program 112 can function (without co-browsing) without executing the co-browsing module 124.

Figure 10:
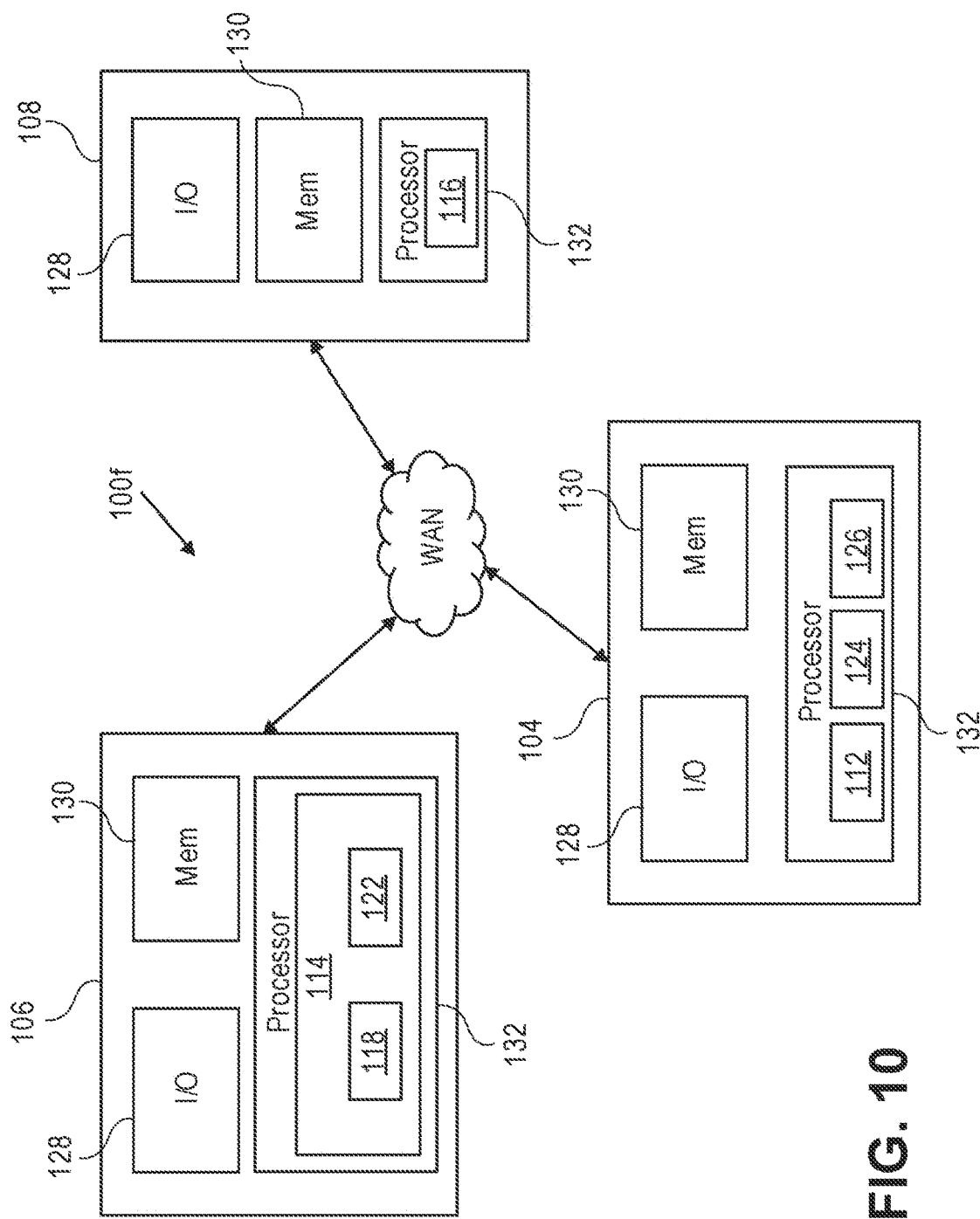

FIG. 10 depicts, in even greater detail, another hardware system 100f configured to host a tax data masking system 102 according to one embodiment. Like the hardware systems 100e depicted in FIG. 9, the hardware system 100f in FIG. 10 includes a server computing device 104, a tax return preparation computing device 106 and a support computing device 108 that are operatively coupled by a network 110. In addition to the tax return preparation program 112 and the co-browsing module 124, the processor 132 in the server computing device 104 depicted in FIG. 10 also includes a metadata markup module 126 (described above). In the embodiment depicted in FIG. 10, the tax return preparation program 112, the co-browsing module 124, and the metadata markup module 126 are related but separate components such that each component can function without executing the other components.

While FIGS. 1-10 depict the server computing device 104, the tax return preparation computing device 106, and the support computing device 116 as being operatively coupled by the same network 110, in other embodiments, these computing devices may be operatively coupled by a plurality (e.g., two or three) networks. While FIGS. 1-10 depict the masking module 118 and the pattern recognition module 122 as parts of first browser 114, in other embodiments, these modules and programs may be separate but related programs running on the tax return preparation computing device 106. FIGS. 1-10 depict the tax return preparation program 112, the co-browsing module 124, and the metadata markup module 126 as separate but related programs running on the server computing device 104. However, in other embodiments, these modules and programs may be parts of each other.

Figure 11:
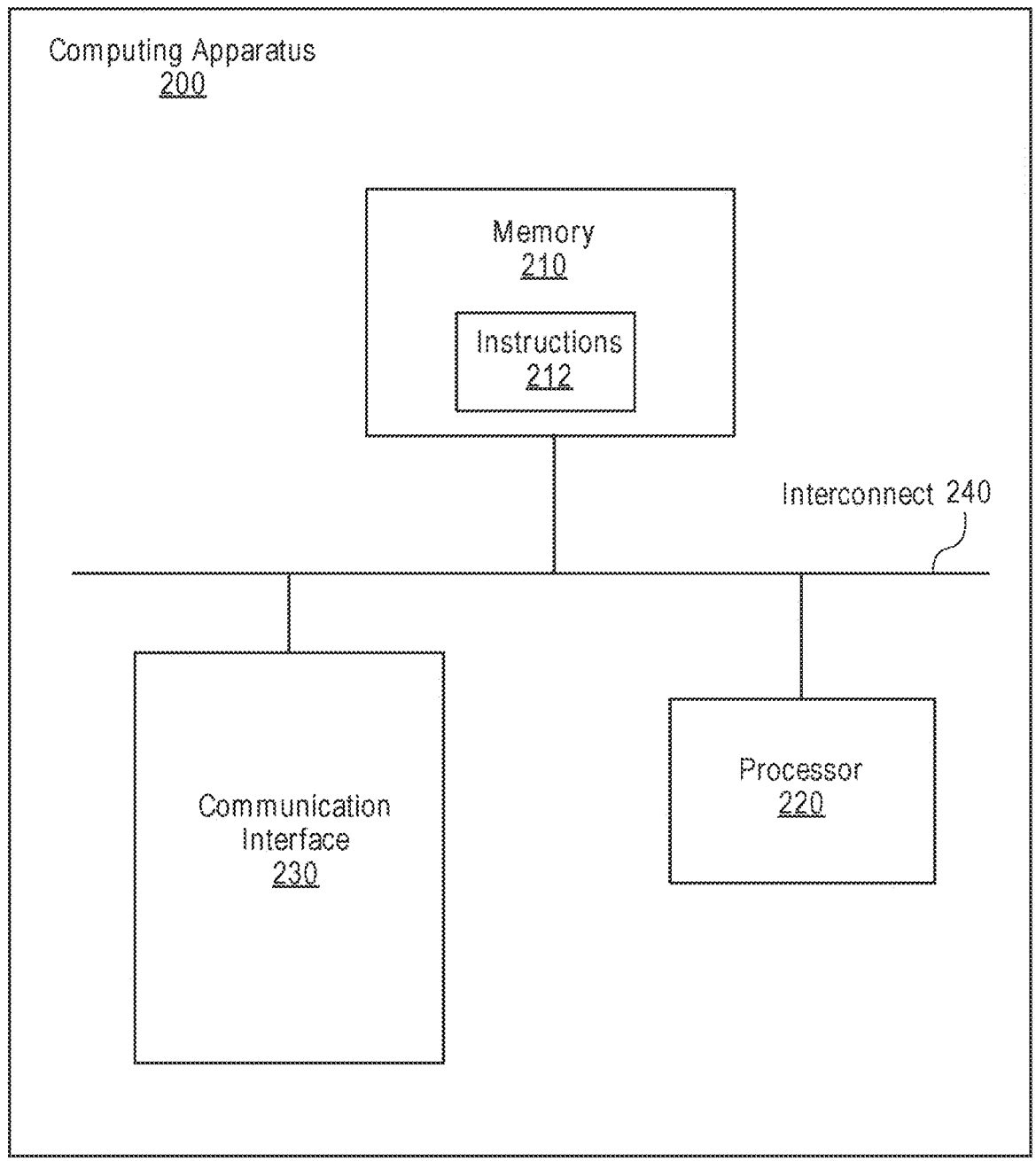
FIG. 11 is a block diagram of a computing apparatus or system in which various embodiments may be implemented or that may be utilized to execute various embodiments.

FIG. 11 generally illustrates certain components of a computing device 200 that may be utilized to execute embodiments and that include a memory 210, program instructions 212, a processor or controller 220 to execute instructions 212, a network or communications interface 230, e.g., for communications with a network or interconnect 240 between such components. The memory 210 may be or include one or more of cache, RAM, ROM, SRAM, DRAM, RDRAM, EEPROM and other types of volatile or non-volatile memory capable of storing data. The processor unit 220 may be or include multiple processors, a single threaded processor, a multi-threaded processor, a multi-core processor, or other type of processor capable of processing data. Depending on the particular system component (e.g., whether the component is a computing device or a hand held mobile communications device), the interconnect 240 may include a system bus, LDT, PCI, ISA, or other types of buses, and the communications or network interface may, for example, be an Ethernet interface, a Frame Relay interface, or other interface. The network interface 230 may be configured to enable a system component to communicate with other system components across a network which may be a wireless or various other networks. It should be noted that one or more components of computing device 200 may be located remotely and accessed via a network. Accordingly, the system configuration provided in FIG. 11 is provided to generally illustrate how embodiments may be configured and implemented. The processors 132 in the server computing device 104, the tax return preparation computing device 106 and the support computing device 108 are programmed with respective electronic tax data acquisition program 112, and first and second browser programs 114, 116 so that they are no longer generic computing devices.

FIGS. 12 to 20B depict various exemplary screenshots displayed in user interfaces 300 of the first and second browser programs 114, 116 in the embodiments described above. The screenshots depict collaborative tax return preparation and masking of taxpayer data during same.

Figure 12:
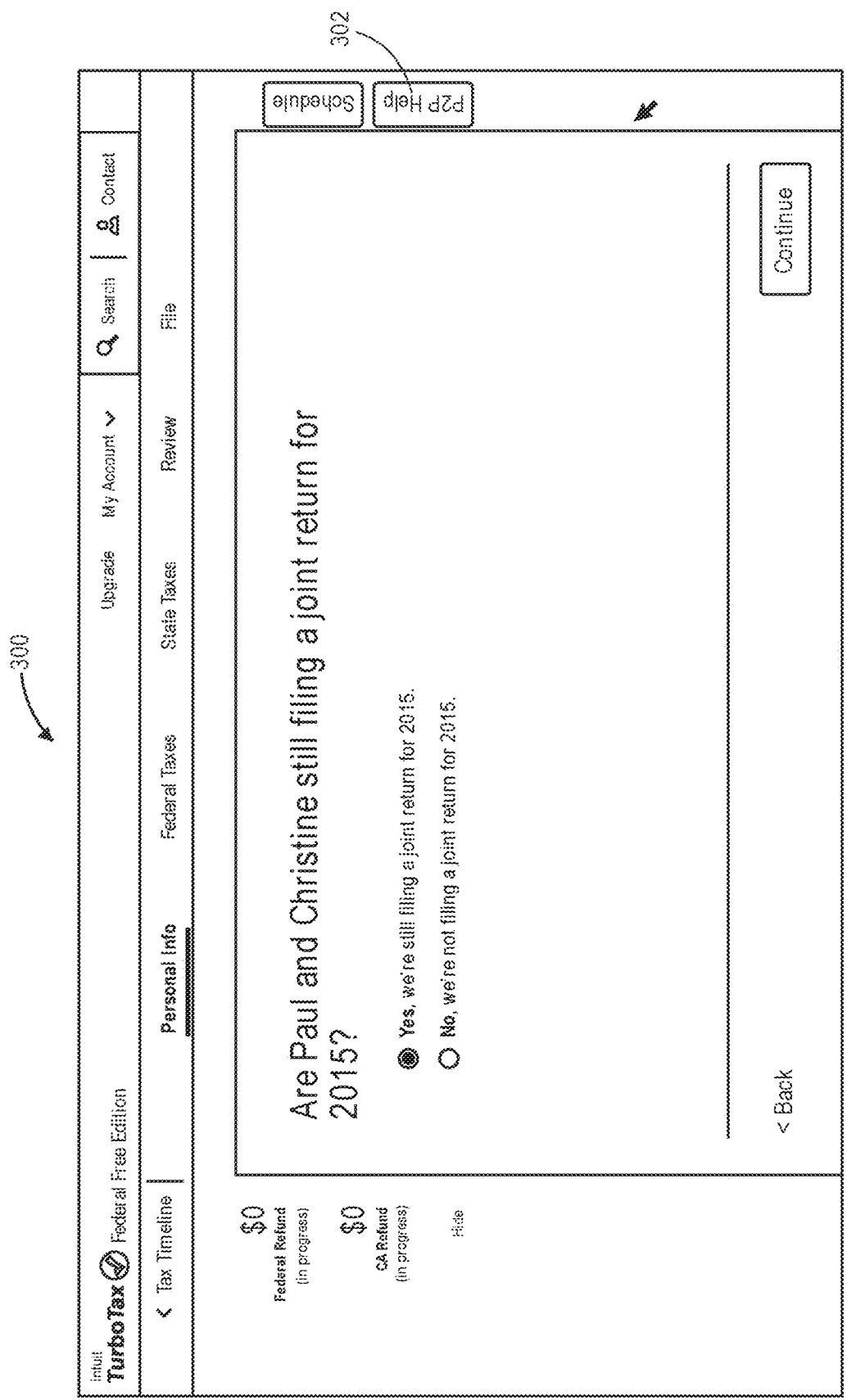

FIG. 12 depicts a user interface 300 facilitating initiation of a collaborative tax return preparation session. The user interface display 300 may be displayed to a preparer user on a screen 120 of a tax return preparation computing device 106. The user interface 300 includes a selectable user interface object 302 (i.e., a "button" labeled "P2P Help") configured to enable initiation of a collaborative tax return preparation session when selected. While FIG. 12 depicts the selectable user interface object 302 begin a part of a particular user interface 300 displayed during electronic tax preparation, the selectable user interface object 302 may be included in some or all of the particular user interface 300 displayed during electronic tax preparation to allow initiation of a collaborative tax return preparation session at any step of electronic tax preparation.

Figure 13:
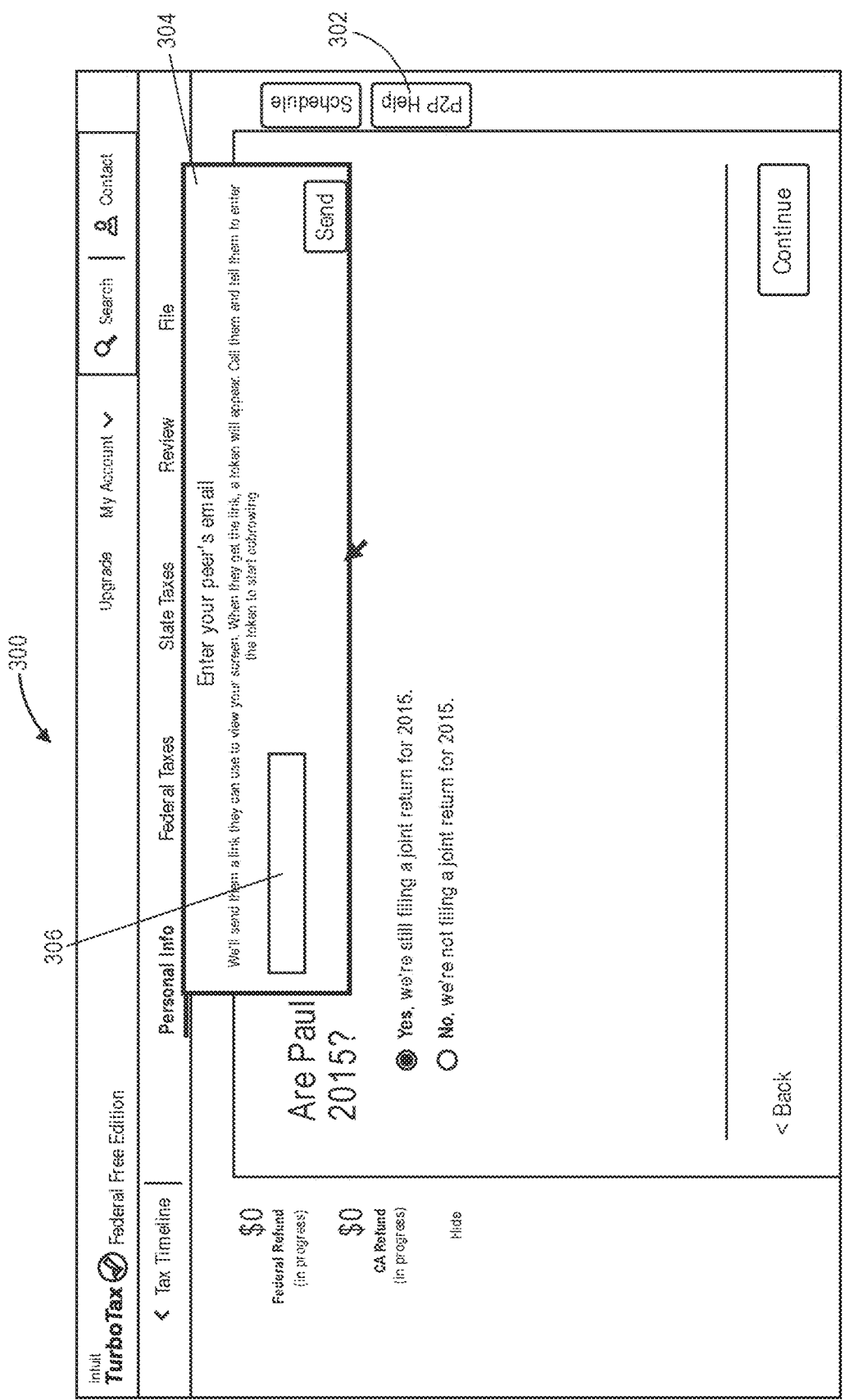

FIG. 13 depicts another user interface 300 facilitating initiation of a collaborative tax return preparation session. The user interface display 300 may be displayed to a preparer user on a screen 120 of a tax return preparation computing device 106. The user interface 300 includes a secondary (i.e., "pop-up") window 304 configured to enable entry of an email address for a support user (i.e., the user from whom the preparer user is seeking assistance). The secondary window 304 includes a textbox user interface object 306 for entry of the support user's email address. The secondary webpage 304 may be rendered in a modal window such that the tax preparation webpage remains open, but is inaccessible, until the modal secondary webpage is closed.

Figure 14:
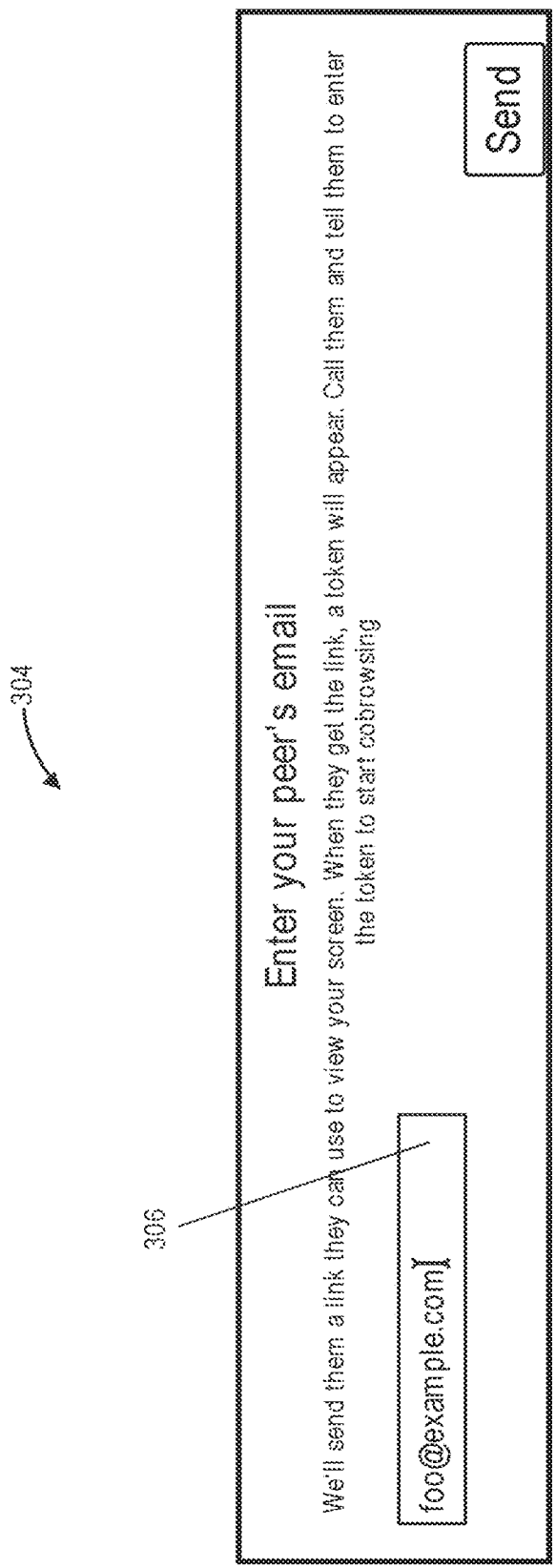

FIG. 14 depicts the secondary window 304 from the user interface 300 in FIG. 13. The textbox user interface object 306 in FIG. 14 includes an email address (i.e., of the support user chosen by the preparer user) as entered by the preparer user into the textbox user interface object 306.

Figure 15:
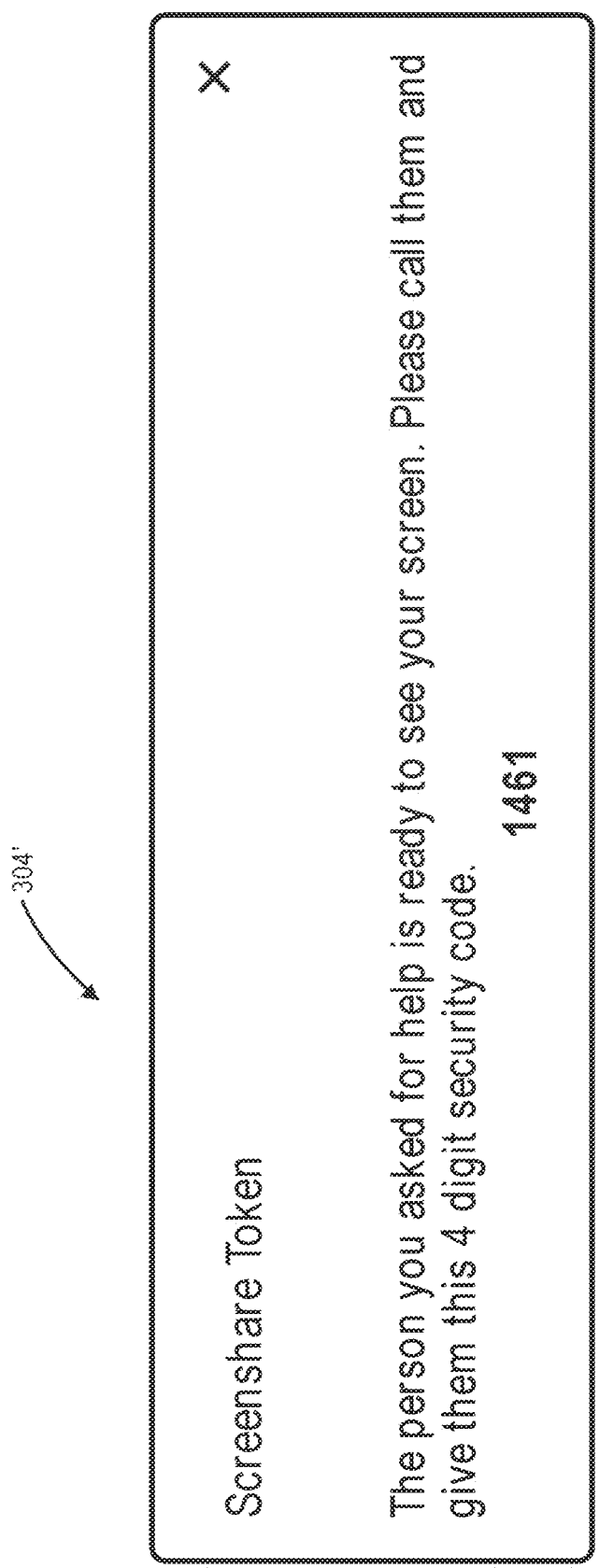

FIG. 15 depicts another secondary window 304' in a user interface 300 that may be displayed to a preparer user on a screen 120 of a tax return preparation computing device 106. The secondary window 304' may be displayed after the preparer user enters an email address of the support user into the textbox user interface object 306 as shown in FIG. 14. The secondary window 304 in FIG. 15 includes a token (i.e., 1461) that is required for the support user to join the collaborative tax return preparation session. The token is a first security measure. It is intended that the preparer user communicates the token to the support user (e.g., by voice or SMS text) to allow the support user to join the collaborative tax return preparation session.

Figure 16:
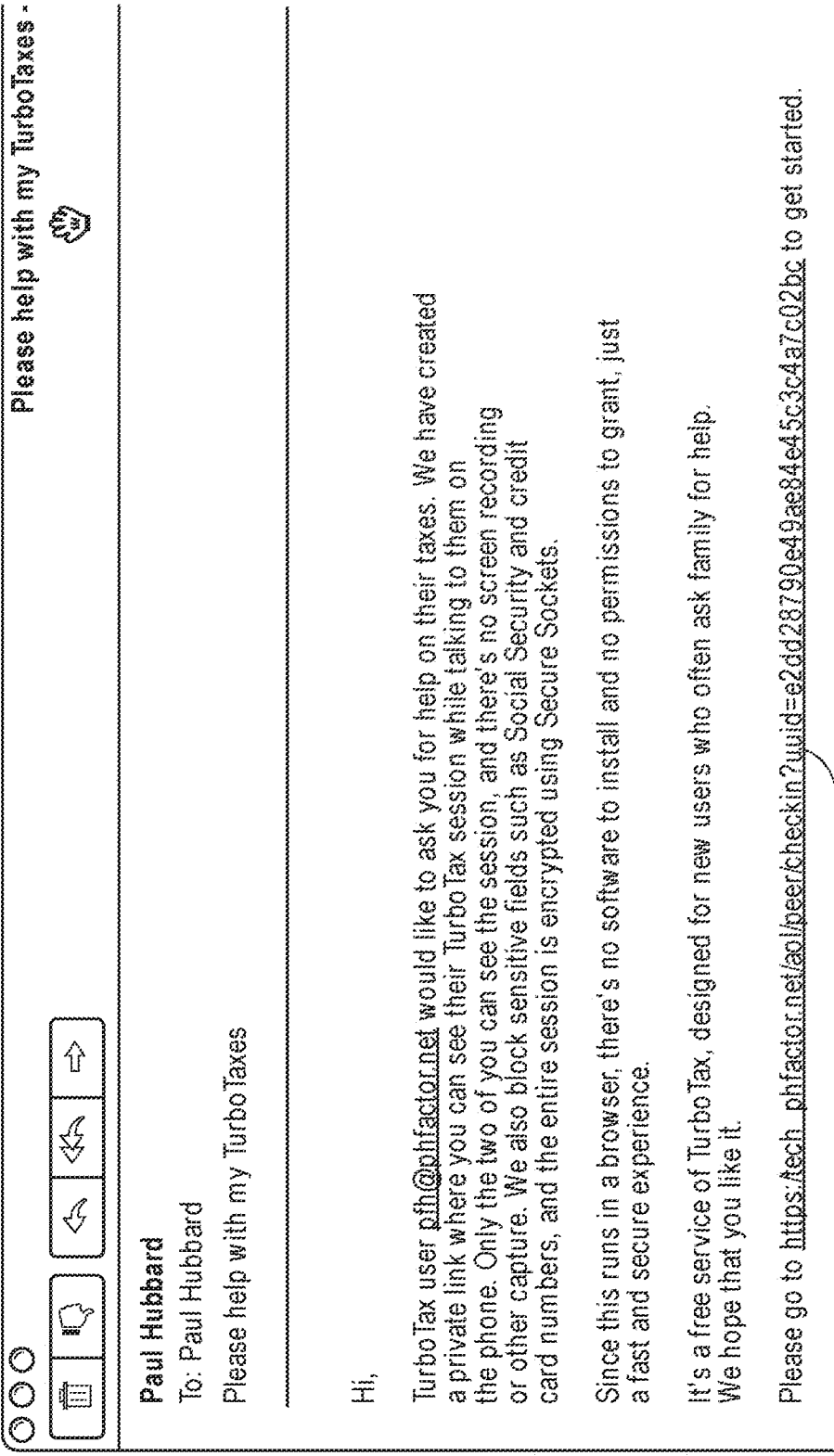

FIG. 16 depicts a user interface 300 that may be displayed to a support user on a screen 120 of a support computing device 108. The user interface 300 depicts an email informing the support user that the preparer user has requested that they join a collaborative tax return preparation session to assist the preparer user with their tax return preparation. The email is a second security measure. The email in the user interface 300 includes a hyperlinked user interface object 308 configured to display a user interface 300 on the second browser program 116 running on the support computing device 108 when selected. The hyperlinked user interface object 308 may include a universally unique identifier ("UUID") generated URL (e.g., a 32 character hexadecimal string) for increased security.

Figure 17:
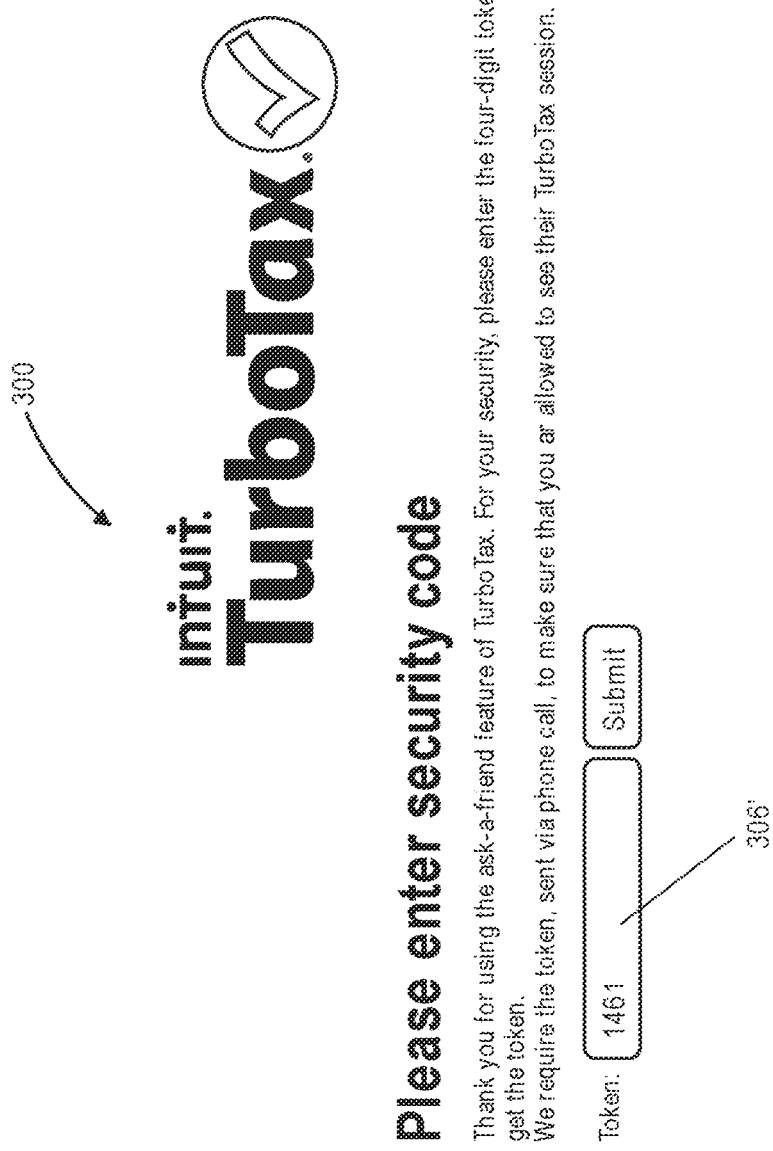

FIG. 17 depicts another user interface 300 that may be displayed to a support user on a screen 120 of a support computing device 108. The user interface 300 in FIG. 17 may be displayed in response to selection of the hyperlinked user interface object 308 in FIG. 16. The user interface 300 in FIG. 17 includes a textbox user interface object 306' for entry of the token. The textbox user interface object 306' in FIG. 17 includes the token (i.e., 1461) as entered by the support user into the textbox user interface object 306'. The preparer user previously communicated the token to the support user. Entry of the token in the textbox user interface object 306' by the support user authenticates the support user's identity and initiates the collaborative tax return preparation session. The collaborative tax return preparation session may be implemented using the co=browsing module running on the server computing device 103 as described above.

Figure 18A:
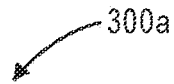
Figure 18A:
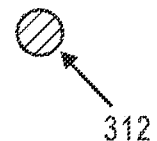
Figure 18B:
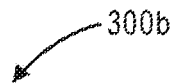
Figure 18B:
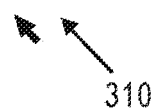

FIGS. 18A and 18B depict user interfaces 300*a*, 300*b* that may be displayed to a preparer user and a support user, respectively, during a collaborative tax return preparation session. User interface 300*a* may be displayed to the preparer user on a screen 120 of a tax return preparation computing device 106. User interface 300*b* may be displayed to the support user on a screen 120 of a support computing device 108. During the collaborative tax return preparation session, the support user's mouse indicator 310 is displayed on the support computing device 108 screen 120, as shown in FIG. 18B. The support user's mouse 310 is also displayed to the prepare user as a shadow mouse indicator 312 on the tax return preparation computing device 106 screen 120, as shown in FIG. 18A.

Figure 19A:
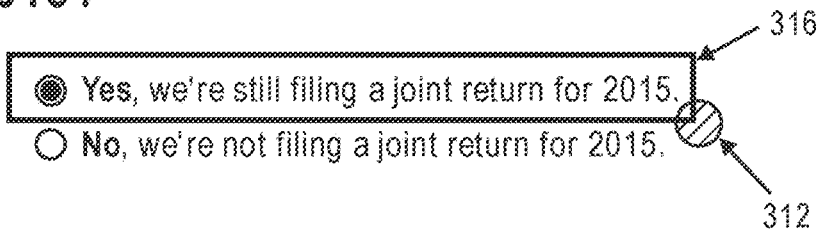
Figure 19B:
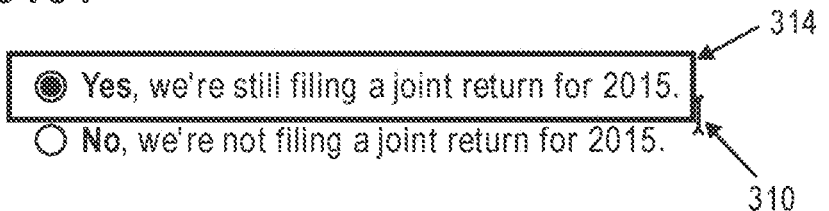

FIGS. 19A and 19B depict user interfaces 300*a*, 300*b* that may be displayed to a preparer user and a support user, respectively, during a collaborative tax return preparation session. User interface 300*a* may be displayed to the preparer user on a screen 120 of a tax return preparation computing device 106. User interface 300*b* may be displayed to the support user on a screen 120 of a support computing device 108. During the collaborative tax return preparation session, the support user may highlight a portion of the user interface 300*b* with a highlight box 314 on the support computing device 108 screen 120 (e.g., by clicking and drawing a box around the portion of the user interface 300*b*), as shown in FIG. 19B. The highlight box 314 is also displayed to the prepare user as a shadow highlight box 316 on the tax return preparation computing device 106 screen 120, as shown in FIG. 19A. The mouse indicator 310 and shadow mouse indicator 312 are also displayed on user interfaces 300*b*, 300*a* in FIGS. 19B and 19A, respectively.

FIGS. 20A and 20B depict user interfaces 300*a*, 300*b* that may be displayed to a preparer user and a support user, respectively, during a collaborative tax return preparation session. User interface 300*a* may be displayed to the preparer user on a screen 120 of a tax return preparation computing device 106. User interface 300*b* may be displayed to the support user on a screen 120 of a support computing device 108. During the collaborative tax return preparation session, the preparer user may enter sensitive taxpayer data 318 (e.g., social security number) in the user interface 300*a*, as shown in FIG. 20A. The collaborative tax return preparation system 102 is configured to display modifications to one of the user interfaces 300*a*, 300*b* in the other user interface 300*b*, 300*a* in real time. However, when the system 102 recognizes sensitive data 318 (e.g., using the pattern recognition module 122) or sensitive data categories/fields 320 (e.g., using the metadata markup module 126), the system 102 masks the sensitive data 318 in the sensitive data category/fields 320 (e.g., using the masking module 118) to form masked sensitive data 322. The sensitive data 318 is displayed to the prepare user on the tax return preparation computing device 106 screen 120, as shown in FIG. 20A. However, only the masked sensitive data 322 (and NOT the sensitive data 318) is sent to the support computing device 108 for display, as shown in FIG. 20B.

As such, sensitive data is never transmitted to the support computing device 108, thereby preserving security of the collaborative tax preparation system 102. The system 102 (e.g., the masking module 118, the pattern recognition module 122, and/or the metadata markup module 126) can also determine a sensitivity level for a particular piece of sensitive data 318 and a security level for a particular support user. Then, the system 102 can determine, based on the sensitivity level of the sensitive data 318 and the security level of the support user, when the sensitive data 318 should be masked before sending to the support user computer 108. Recognition of sensitive tax data 318 or sensitive tax data category/field 320, masking of sensitive tax data 318, and transmission and display of masked sensitive data 322 occurs in real time during the collaborative tax return preparation process so that the preparer and support users do not notice any appreciable lag.

Having described various aspects of tax data masking systems according to various embodiments, computer-implemented methods for masking taxpayer data during collaborative preparation of an electronic tax return using the tax data masking systems will now be described.

Figure 21:
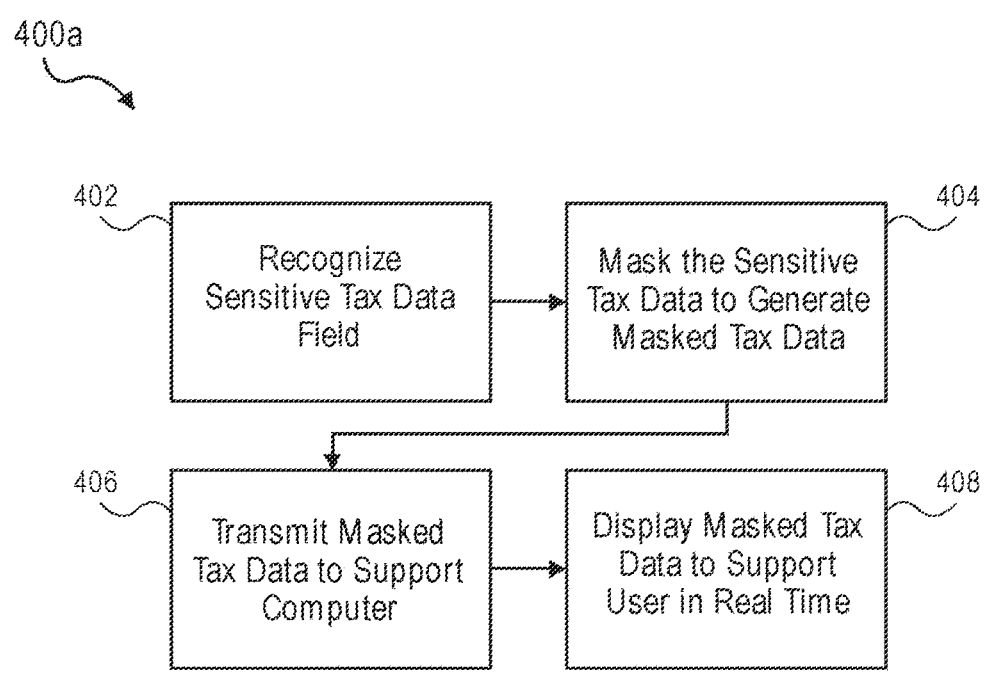
FIGS. 21 to 23 are flow charts depicting computer-implemented methods of masking tax data during collaborative preparation of an electronic tax return according to various embodiments.

FIG. 21 depicts a computer-implemented method 400*a* for masking tax data during collaborative preparation of an electronic tax return according to one embodiment. The method 400*a* may be implemented using the collaborative tax return preparation systems (e.g., 102) running on the hardware systems (e.g., 100) depicted in FIGS. 1-10.

At step 402, the system 102 recognizes sensitive taxpayer data 318 (e.g., social security number, credit card number, total income, etc.) entered by the preparer user in the user interface 300*a* displayed on the on the tax return preparation computing device 106 screen 120, as shown in FIG. 20A. The pattern recognition module 122 in the first browser program 114 may scan the entered data to identify sensitive taxpayer data 318 based on the format of the data.

At step 404, the system 102 masks the sensitive taxpayer data 318 to generate masked taxpayer data 322. The masking module 118 in the first browser program 114 may locate the portion of the user interface 300*a* containing the sensitive taxpayer data 318 and replace that portion with unreadable images (e.g., splat characters) in the user interface 300*b* for transmission to the support computing device 108. The masking module 118 may be a JavaScript program module in the first browser program 114.

At step 406, the system 102 transmits (using the input/output modules in the tax return preparation computing device 106 and the server computing device 104) the masked sensitive taxpayer data 322 to the support computing device 108. The masked sensitive taxpayer data 322 is transmitted through the network 110, which may include the Internet.

At step 408, the system 102 displays the masked sensitive taxpayer data 322, as a part of the user interface 300*b* in the support computing device 108 screen 120. The system 102 displays the masked sensitive taxpayer data 322 in real time.

The method 400*a* facilitates co-browsing in a collaborative tax return preparation process without displaying sensitive taxpayer data to a support user. This increases security of the collaborative tax return preparation system 102. The method 400*a* may include determining a sensitivity level for a particular piece of sensitive data 318 and a security level for a particular support user. Then, the system 102 can determine, based on the sensitivity level of the sensitive data 318 and the security level of the support user, when the sensitive data 318 should be masked before sending to the support user computer 108. Recognition of sensitive tax data 318 (step 402), masking of sensitive tax data 318 (step 404), and transmission (step 406) and display of masked sensitive data 322 (step 408) occurs in real time during the collaborative tax return preparation process so that the preparer and support users do not notice any appreciable lag. The method 400a can take place automatically without user intervention.

Figure 22:
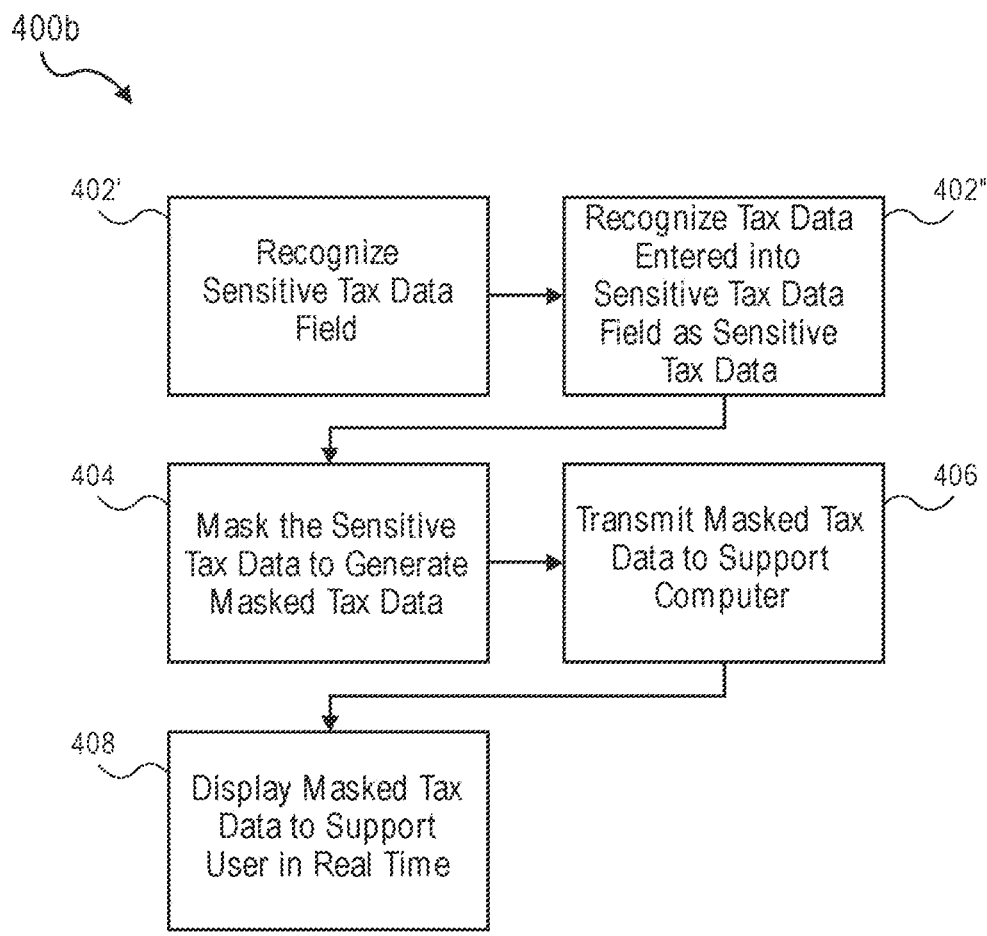

FIG. 22 depicts a computer-implemented method 400b for masking tax data during collaborative preparation of an electronic tax return according to another embodiment. The method 400b may be implemented using the collaborative tax return preparation systems (e.g., 102) running on the hardware systems (e.g., 100) depicted in FIGS. 1-10.

At step 402', the system 102 recognizes a sensitive taxpayer data category/field 320 (e.g., social security number, credit card number, total income, etc.) in an electronic tax form, as shown in FIG. 20A. The metadata markup module 126 in the first browser program 114 may scan the electronic tax form to identify fields requesting sensitive taxpayer data based on the format of the field, previous tagging of the same electronic tax form, OCR, etc.

At step 402", the system 102 (e.g., the pattern recognition module 122) recognizes data entered into the sensitive taxpayer data category/field 320 by the preparer user in the user interface 300a displayed on the on the tax return preparation computing device 106 screen 120 as sensitive taxpayer data 318. The system 102 recognizes the sensitive taxpayer data 318 based only on the fact that the data was entered into the sensitive taxpayer data category/field 320. In other embodiments, the system 102 may recognize data as sensitive taxpayer data 318 base on both the format of the data and the fact that the data was entered into the sensitive taxpayer data category/field 320.

At step 404, the system 102 masks the sensitive taxpayer data 318 to generate masked taxpayer data 322. The masking module 118 in the first browser program 114 may locate the portion of the user interface 300a containing the sensitive taxpayer data 318 and replace that portion with unreadable images (e.g., splat characters) in the user interface 300b for transmission to the support computing device 108. The masking module 118 may be a JavaScript program module in the first browser program 114.

At step 406, the system 102 transmits (using the input/output modules in the tax return preparation computing device 106 and the server computing device 104) the masked sensitive taxpayer data 322 to the support computing device 108. The masked sensitive taxpayer data 322 is transmitted through the network 110, which may include the Internet.

At step 408, the system 102 displays the masked sensitive taxpayer data 322, as a part of the user interface 300b in the support computing device 108 screen 120. The system 102 displays the masked sensitive taxpayer data 322 in real time.

The method 400b facilitates co-browsing in a collaborative tax return preparation process without displaying sensitive taxpayer data to a support user. This increases security of the collaborative tax return preparation system 102. The method 400b may include determining a sensitivity level for a particular piece of sensitive data 318 and a security level for a particular support user. Then, the system 102 can determine, based on the sensitivity level of the sensitive data 318 and the security level of the support user, when the sensitive data 318 should be masked before sending to the support user computer 108. Recognition of sensitive tax data category/field 320 (step 402'), recognition of sensitive tax data 318 (step 402"), masking of sensitive tax data 318 (step 404), and transmission (step 406) and display of masked sensitive data 322 (step 408) occurs in real time during the collaborative tax return preparation process so that the preparer and support users do not notice any appreciable lag. The method 400b can take place automatically without user intervention.

Figure 23:
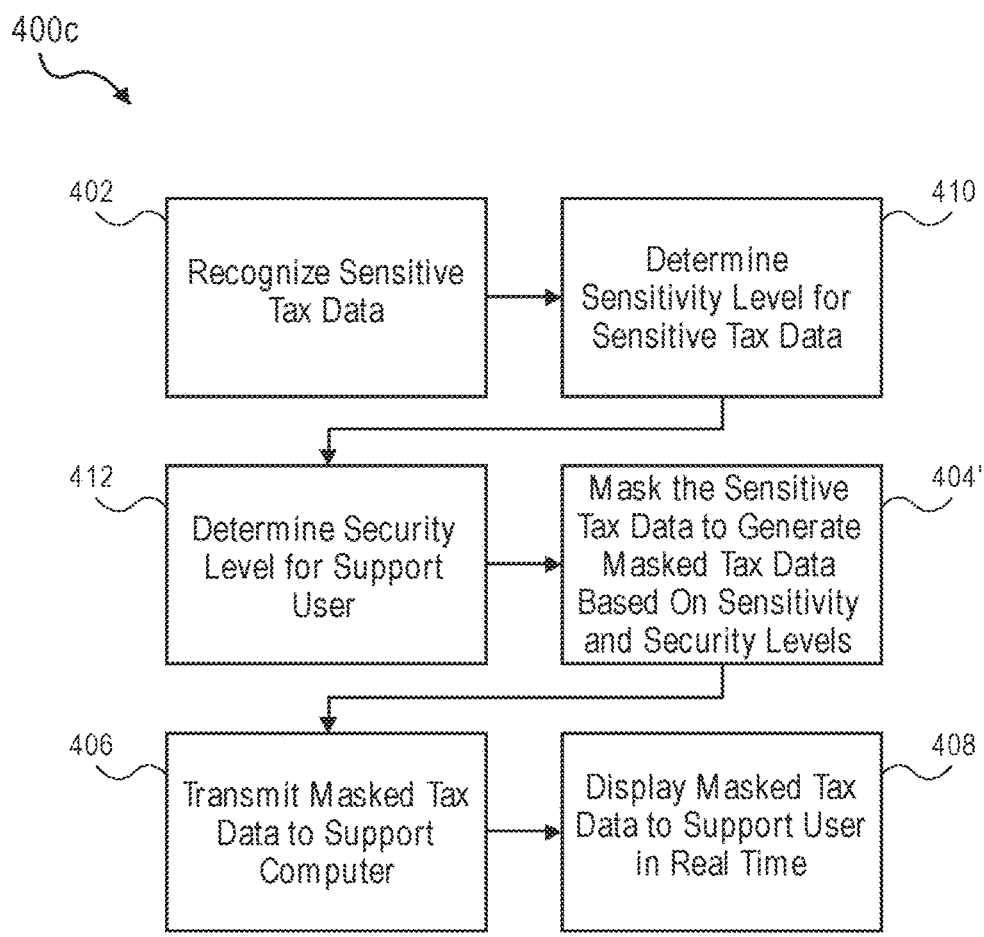

FIG. 23 depicts a computer-implemented method 400c for masking tax data during collaborative preparation of an electronic tax return according to still another embodiment. The method 400c may be implemented using the collaborative tax return preparation systems (e.g., 102) running on the hardware systems (e.g., 100) depicted in FIGS. 1-10.

At step 402, the system 102 recognizes sensitive taxpayer data 318 (e.g., social security number, credit card number, total income, etc.) entered by the preparer user in the user interface 300a displayed on the on the tax return preparation computing device 106 screen 120, as shown in FIG. 20A. The pattern recognition module 122 in the first browser program 114 may scan the entered data to identify sensitive taxpayer data 318 based on the format of the data.

Unlike method 400a depicted in FIG. 21, method 400c includes steps 410 and 412 intervening between steps 402 and 404'. At step 410, the system 102 determines a sensitivity level for the sensitive tax data 318. The pattern recognition module 122 can determine the sensitivity level based on the format of the data.

At step 412, the system 102 determines a security level for the support user. The system 102 can determine the security level based on the characteristics of the support user chosen by the preparer user. The system 102 can also ask the preparer user to choose a security level.

At step 404', the system 102 masks the sensitive taxpayer data 318 to generate masked taxpayer data 322 based on the sensitivity and security levels. If the security level of the support user allows access to data at the sensitivity level, no masking is performed. Otherwise, the masking module 118 in the first browser program 114 may locate the portion of the user interface 300a containing the sensitive taxpayer data 318 and replace that portion with unreadable images (e.g., splat characters) in the user interface 300b for transmission to the support computing device 108. The masking module 118 may be a JavaScript program module in the first browser program 114.

At step 406, the system 102 transmits (using the input/output modules in the tax return preparation computing device 106 and the server computing device 104) the masked sensitive taxpayer data 322 to the support computing device 108. The masked sensitive taxpayer data 322 is transmitted through the network 110, which may include the Internet.

At step 408, the system 102 displays the masked sensitive taxpayer data 322, as a part of the user interface 300b in the support computing device 108 screen 120. The system 102 displays the masked sensitive taxpayer data 322 in real time.

The method 400c facilitates co-browsing in a collaborative tax return preparation process without displaying sensitive taxpayer data to a support user. This increases security of the collaborative tax return preparation system 102. The method 400c may include determining a sensitivity level for a particular piece of sensitive data 318 and a security level for a particular support user. Then, the system 102 can determine, based on the sensitivity level of the sensitive data 318 and the security level of the support user, when the sensitive data 318 should be masked before sending to the support user computer 108. Recognition of sensitive tax data 318 (step 402), determining the sensitivity level (step 410), determining the security level (step 412), masking of sensitive tax data 318 (step 404'), and transmission (step 406) and display of masked sensitive data 322 (step 408) occurs in real time during the collaborative tax return preparation process so that the preparer and support users do not notice any appreciable lag. The method 400c can take place automatically without user intervention.

Figure 24:
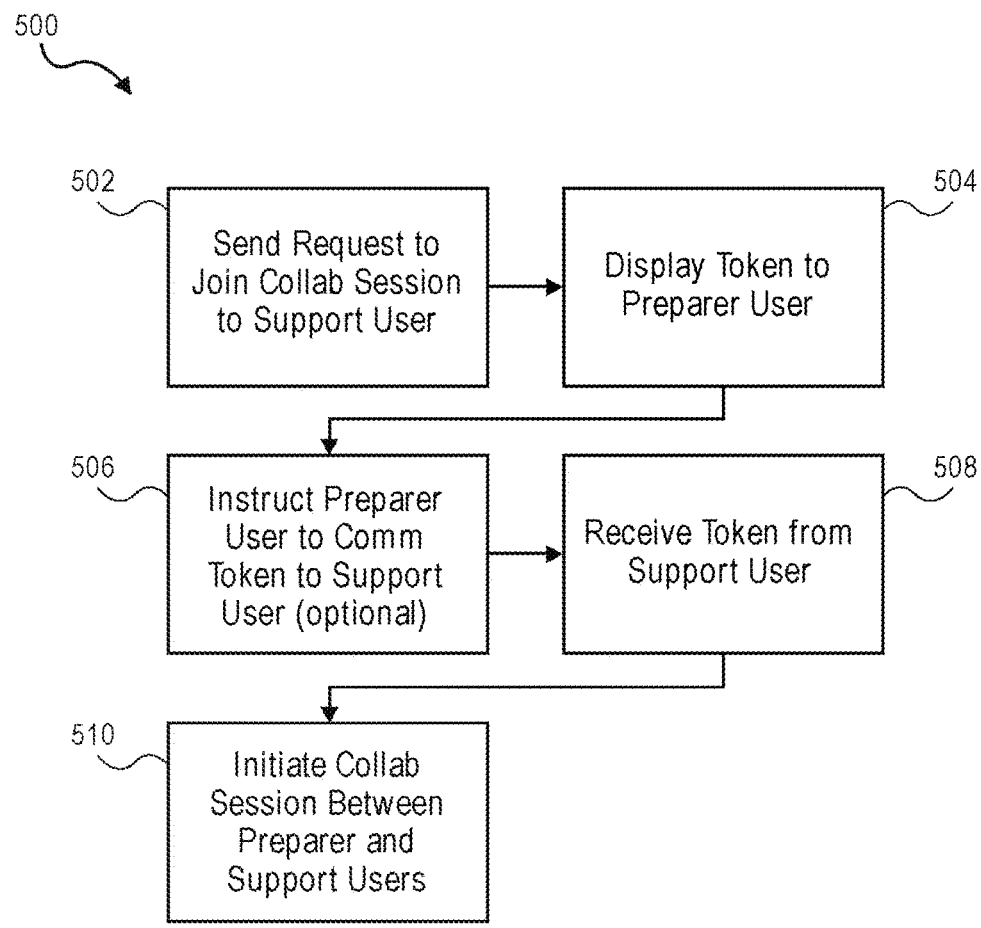
FIG. 24 is a flow chart depicting a computer-implemented method of securely initiating collaborative preparation of an electronic tax return according to one embodiment.

FIG. 24 depicts a computer-implemented method 500 for initiating collaborative preparation of an electronic tax return according to one embodiment. The method 500 may be implemented using the collaborative tax return preparation systems (e.g., 102) running on the hardware systems (e.g., 100) depicted in FIGS. 1-10.

At step 502, the system 102 (e.g., the co-browsing module 124) sends request to join a collaborative tax return preparation session to a support computing device 108. The support computing device 108 displays the request in a user interface 300 on a screen 120 as shown in FIG. 16. The request can include a hyperlinked user interface object 308 configured to display a user interface 300 on the second browser program 116 running on the support computing device 108 when selected. The hyperlinked user interface object 308 may include a universally unique identifier ("UUID") generated URL (e.g., a 32 character hexadecimal string) for increased security. The hyperlinked user interface object 308 is one of two security measures.

At step 504, the system 102 (e.g., the co-browsing module 124) displays a token (second of two security measures) to the preparer user on a screen 120 of a tax return preparation computing device 106, as shown in FIG. 15.

At step 506, the system 102 (e.g., the co-browsing module 124) optionally displays a user interface 300 to the preparer user on a screen 120 of a tax return preparation computing device 106 instructing the preparer user to communicate the toke to the support user (e.g., by phone or SMS text).

At step 508, the system 102 (e.g., the co-browsing module 124) receives the token from the support user through the user interface 300 displayed on the screen 120 of the support computing device 108 as shown in FIG. 17.

At step 510, the system 102 (e.g., the co-browsing module 124) initiates the collaborative tax return preparation session as shown in FIGS. 18A to 20B. The system 102 has received both forms of identity authentication (selection of the hyperlinked user interface object 308 and the token). Therefore, the system 102 can initiate the collaborative tax return preparation session with increased security.

After the system 102 has initiated the collaborative tax return preparation session, the system 102 can also mask sensitive taxpayer data for display on the support computer 108 as depicted in FIGS. 20A-23 and described above.

While FIGS. 21-24 illustrate embodiments of masking a single sensitive taxpayer datum, embodiments are not so limited. For example, the system 102 may identify and mask a plurality of sensitive taxpayer data.

While FIGS. 21 and 22 illustrate methods using a single characteristic to identify sensitive taxpayer data, embodiments are not so limited. For example, multiple characteristics (e.g., data format and data category/field) can be used to improve identification of sensitive taxpayer data.

While FIGS. 21-24 illustrate embodiments of masking sensitive taxpayer data during collaborative tax return preparation, embodiments are not so limited. For example, the masking systems and methods described herein are applicable to any peer-to-peer co-browsing system. In one embodiment, a financial advisor or trusted friend may co-browse a user's financial management system to provide financial advice. The masking systems and methods described herein can protect sensitive financial information during such a co-browsing system.

Exemplary system to which the masking systems and methods are applicable include financial management systems (such as MINT or QUICKEN financial management systems), accounts the taxpayer has with an online social media website, third parties databases or resources (such as government databases or documents, such as property tax records, Department of Motor Vehicle (DMV) records), and other external sources of taxpayer data. MINT and QUICKEN are registered trademarks of Intuit Inc., Mountain View, Calif.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 220 performs steps or executes program instructions 212 within memory 210 and/or embodied on the carrier to implement method embodiments.

Although particular embodiments have been shown and described, it should be understood that the above discussion is not intended to limit the scope of these embodiments. While embodiments and variations of the many aspects of embodiments have been disclosed and described herein, such disclosure is provided for purposes of explanation and illustration only. Thus, various changes and modifications may be made without departing from the scope of the claims.

Moreover, while embodiments have been described with reference to data that has been entered into a field, e.g., by the user, the embodiments also include data that have been obtained automatically without or with minimal user intervention.

Where methods and steps described above indicate certain events occurring in certain order, those of ordinary skill in the art having the benefit of this disclosure would recognize that the ordering of certain steps may be modified and that such modifications are in accordance with the variations of the disclosed embodiments. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A computer-implemented method for masking sensitive data during a collaborative preparation of an electronic form using a system including a server computer, a preparation computer, and a support computer operatively coupled by a network, the method comprising:

executing a first browser on the preparation computer, the first browser being used by a user to enter data into the electronic form;

the first browser identifying if data entered by the user comprises a first datum for the electronic form comprising sensitive data; and automatically masking, by a masking module of the first browser, the first datum when the first datum is identified as comprising sensitive data, said masking of the first datum being performed without user intervention and before transmitting the first datum to the server computer for subsequent transmission to the support computer, the first datum being masked in real time during the collaborative preparation of the electronic form such that the sensitive data is not transmitted to the support computer or displayed by a second browser program operating on the support computer.

2. The method of claim 1, further comprising the masking module determining a security level for the support computer and masking the first datum based on the security level.

3. The method of claim 1, wherein the first browser includes a pattern recognition module and the method further comprises the pattern recognition module identifying the sensitive data.

4. The method of claim 1, wherein the server computer includes a metadata markup module running thereon and the method further comprises the metadata markup module identifying sensitive data fields in the electronic form.

5. The method of claim 1, wherein the server computer includes a co-browsing module running thereon and the method further comprises the co-browsing module sending data related to the electronic form to the preparation computer and the support computer for display using the first and second browser programs, respectively.

6. The method of claim 5, further comprising the co-browsing module sending an invitation to join a co-browsing session to the support computer, the invitation including a hyperlink.

7. The method of claim 6, further comprising the co-browsing module generating an access code for the co-browsing session and sending the access code to the preparation computer.

8. The method of claim 7, further comprising the co-browsing module sending data related to the electronic form to the support computer only after the support computer enters the access code at a page accessed through the hyperlink.

9. A system for masking sensitive data during collaborative preparation of an electronic form, the system comprising:

a server computer having a form preparation program running thereon;

a preparation computer having a first browser program running thereon; and a support computer having a second browser program running thereon, the server computer, preparation computer, and the support computer being operatively coupled by a network;

the first browser being used by a user to enter data into the electronic form and being adapted to identify if data entered by the user comprises a first datum comprising sensitive data, the first browser including a masking module configured to automatically mask the first datum when the first datum is identified as comprising sensitive data, said masking of the first datum being performed without user intervention and before transmitting the first datum to the server computer for subsequent transmission to the support computer, and the first datum being masked in real time during collaborative preparation of the electronic form such that sensitive data is not transmitted to the support computer or displayed by the second browser program.

10. The system of claim 9, wherein the masking module is configured to determine a security level for the support computer and to mask the first datum based on the security level.

11. The system of claim 9, wherein the first browser includes a pattern recognition module configured to identify sensitive user data.

12. The system of claim 9, wherein the server computer has a metadata markup module running thereon, the metadata markup module being configured to identify sensitive user data fields.

13. The system of claim 9, wherein the server computer has a co-browsing module running thereon, the co-browsing module being configured to send data related to the electronic form to the form preparation computer and the support computer for display using the first and second browser programs, respectively.

14. The system of claim 13, wherein the co-browsing module is configured to send an invitation to join a co-browsing session to the support computer, the invitation including a hyperlink.

15. The system of claim 14, wherein the co-browsing module is configured to generate an access code for the co-browsing session and send the access code to the form preparation computer.

16. The system of claim 15, wherein the co-browsing module is configured to send data related to the electronic form to the support computer only after the support computer enters the access code at a page accessed through the hyperlink.

17. The system of claim 9, wherein the masking module automatically masks the first datum when the first datum is identified as comprising sensitive data using a JavaScript program.

* * * * *